(12) United States Patent
Yushin et al.

(10) Patent No.: US 11,217,779 B2
(45) Date of Patent: Jan. 4, 2022

(54) CURVED TWO-DIMENSIONAL NANOCOMPOSITES FOR BATTERY ELECTRODES

(71) Applicant: Georgia Tech Research Corporation, Atlanta, GA (US)

(72) Inventors: Gleb Yushin, Atlanta, GA (US); Kara Evanoff, Oakland, CA (US); Oleksandr Magazynskyy, Atlanta, GA (US)

(73) Assignee: GEORGIA TECH RESEARCH CORPORATION, Atlanta, GA (US)

( * ) Notice: Subject to any disclaimer, the term of this patent is extended or adjusted under 35 U.S.C. 154(b) by 12 days.

(21) Appl. No.: 16/378,395

(22) Filed: Apr. 8, 2019

(65) Prior Publication Data

US 2019/0237744 A1  Aug. 1, 2019

Related U.S. Application Data

(63) Continuation of application No. 13/436,766, filed on Mar. 30, 2012, now Pat. No. 10,256,458.

(60) Provisional application No. 61/470,781, filed on Apr. 1, 2011.

(51) Int. Cl.
| | |
|---|---|
| *H01M 4/04* | (2006.01) |
| *H01M 4/36* | (2006.01) |
| *H01M 4/38* | (2006.01) |
| *H01M 4/134* | (2010.01) |
| *H01M 4/583* | (2010.01) |

(Continued)

(52) U.S. Cl.
CPC ........... *H01M 4/0402* (2013.01); *H01M 4/04* (2013.01); *H01M 4/0404* (2013.01); *H01M 4/134* (2013.01); *H01M 4/362* (2013.01); *H01M 4/366* (2013.01); *H01M 4/386* (2013.01); *H01M 4/387* (2013.01); *H01M 4/46* (2013.01); *H01M 4/583* (2013.01); *H01M 4/78* (2013.01)

(58) Field of Classification Search
CPC .... H01M 4/0402; H01M 4/366; H01M 4/583; H01M 4/386; H01M 4/134
See application file for complete search history.

(56) References Cited

U.S. PATENT DOCUMENTS

| | | | | |
|---|---|---|---|---|
| 7,623,340 B1 * | 11/2009 | Song | .................. | H01G 11/36 361/502 |
| 2005/0084760 A1 * | 4/2005 | Hwang | ................. | H01M 4/667 429/234 |

(Continued)

FOREIGN PATENT DOCUMENTS

| | | | | |
|---|---|---|---|---|
| WO | WO-2010128310 A1 * | 11/2010 | ......... | H01M 4/0492 |

*Primary Examiner* — Jonathan G Jelsma
(74) *Attorney, Agent, or Firm* — Muncy, Geissler, Olds & Lowe, P.C.; Daniel Podhajny

(57) ABSTRACT

A battery electrode composition is provided that comprises a composite material comprising one or more nanocomposites. The nanocomposites may each comprise a planar substrate backbone having a curved geometrical structure, and an active material forming a continuous or substantially continuous film at least partially encasing the substrate backbone. To form an electrode from the electrode composition, a plurality of electrically-interconnected nanocomposites of this type may be aggregated into one or more three-dimensional agglomerations, such as substantially spherical or ellipsoidal granules.

23 Claims, 18 Drawing Sheets

(51) Int. Cl.
*H01M 4/78* (2006.01)
*H01M 4/46* (2006.01)

(56) References Cited

U.S. PATENT DOCUMENTS

| 2010/0143798 A1* | 6/2010 | Zhamu | H01M 10/0525 |
| | | | 429/212 |
| 2011/0274970 A1* | 11/2011 | Lee | H01M 4/134 |
| | | | 429/213 |
| 2012/0053288 A1* | 3/2012 | Morishita | B82Y 30/00 |
| | | | 524/547 |
| 2012/0164539 A1* | 6/2012 | Zhamu | H01M 4/382 |
| | | | 429/300 |

* cited by examiner

CURVED TWO-DIMENSIONAL NANOCOMPOSITES FOR BATTERY ELECTRODES

CROSS-REFERENCE TO RELATED APPLICATIONS

The present Application for Patent is a Continuation of U.S. patent application Ser. No. 13/436,766 entitled "Curved Two-Dimensional Nanocomposites for Battery Electrodes" filed on Mar. 30, 2012, which claims priority to Provisional Application No. 61/470,781 entitled "Three-Dimensional Porous Particles Composed of Curved Two-Dimensional Nano-Sized Layers for Li-ion Batteries" filed on Apr. 1, 2011, each of which is expressly incorporated by reference herein.

BACKGROUND

Field

The present disclosure relates generally to energy storage devices, and more particularly to lithium-ion battery technology and the like.

Background

Owing in part to their relatively high energy densities, light weight, and potential for long lifetimes, lithium-ion (Li-ion) batteries are used extensively in consumer electronics. In many applications, Li-ion batteries have essentially replaced nickel-cadmium and nickel-metal-hydride batteries. Despite their increasing commercial prevalence, further development of Li-ion batteries is needed, particularly for potential applications in low- or zero-emission hybrid-electrical or fully-electrical vehicles, consumer electronics, energy-efficient cargo ships and locomotives, aerospace, and power grids. Such high-power applications will require electrodes with higher specific capacities than those used in currently-existing Li-ion batteries.

Currently, carbon-based materials (e.g., graphite) are employed as the predominant anode material in Li-ion batteries. Carbon (C), in the form of graphite, has a maximum or theoretical specific capacity of about 372 milli-Ampere hours per gram (mAh/g), but suffers from significant irreversible capacity losses during the first formation cycling. Notably, during the first charge cycle, the battery electrolyte decomposes on the graphite surface and a significant number (typically in the range of about 5%-15%) of lithium ions present in the cathode during the initial charge (or intercalated into the graphite during charging) become buried in the decomposed layer of electrolyte and cannot be extracted therefrom upon discharge of the battery. The higher specific surface area of other low voltage (e.g., about 0 V-1.2 V vs. Li/Li+) anode materials generally enhances the degree of electrolyte decomposition and, hence, the magnitude of the irreversible capacity losses.

Capacity storage in a Li-ion battery anode may be improved to a degree by substituting graphene for graphite to increase the number of lithiation sites (i.e., sites for the storage of lithium ions during charging). However, graphene-based anodes are susceptible to other problems, including still very high irreversible capacity losses upon initial cycling (due to their high specific surface area, on which the electrolyte decomposes), correspondingly low Coulombic Efficiency (CE) during both the first and also subsequent cycling, and limited overall stability caused by the separation of graphene layers. While composite electrodes employing graphene nanosheets, carbon nanotubes, and/or fullerenes have been shown to increase capacity, they have failed to provide the level of stability required for widespread adoption in industry. Graphene therefore remains unsuitable as a replacement to current graphite-based anode technology.

A variety of higher capacity materials have been investigated to overcome the drawbacks of carbon-based materials. Silicon-based materials, for example, have received great attention as anode candidates because they exhibit specific capacities that are an order of magnitude greater than that of conventional graphite. Silicon has the highest theoretical specific capacity among metals, topping out at about 4200 mAh/g. Unfortunately, silicon and similar materials suffer from their own significant challenges.

One limitation of silicon is its relatively low electrical conductivity. Another limitation is the relatively low diffusion coefficient of lithium in silicon, leading to a low conductivity of lithium ions permeating silicon. The primary challenge of silicon-based anode materials, however, is the volume expansion and contraction that occurs as a result of lithium ion alloying or dealloying, respectively, during charge cycling of the battery. In some cases, a silicon-based anode can exhibit an increase and subsequent decrease in volume of up to about 400%. The high level of strain experienced by the anode material can cause irreversible mechanical damage to the anode. Ultimately, this can lead to a loss of contact between the anode and underlying current collector.

To mitigate such detrimental effects, various composite electrodes formed from higher capacity materials and different carbon arrangements have been explored, ranging from so-called three-dimensional (3-D) micron-sized particle structures, to one-dimensional (1-D) nanotube structures, to zero-dimensional (0-D) nanoparticle structures. The different structures have been fabricated by a corresponding variety of techniques, including physical mixing, decomposition of C- and Si-containing precursors, and other solution-based methods. However, each of these conventional structures has failed to provide the level of performance required for widespread adoption. Many suffer from limited porosity available for volume changes in the active material, non-uniform material properties at the nanoscale, a high surface area that leads to very large irreversible capacity losses and low CE upon initial cycling as well as during subsequent cycling, and other problems.

Many high capacity cathode materials for Li-ion batteries also suffer from low electrical conductivity, a low diffusion coefficient of lithium, high volume changes during battery operation, or a combination of such shortcomings.

Accordingly, despite the advancements made in electrode materials, high capacity Li-ion batteries remain somewhat limited in their applications and there remains a need for improved electrodes for use in Li-ion batteries. Improved anodes and cathodes and, ultimately, the improved Li-ion batteries, could open up new applications and advance the adoption of so-called high-power devices such as those discussed above.

SUMMARY

Embodiments disclosed herein address the above stated needs by providing improved battery components, improved batteries made therefrom, and methods of making and using the same.

In some embodiments, a battery electrode composition is provided that comprises a composite material comprising one or more nanocomposites. The nanocomposites may each comprise a planar substrate backbone having a curved geometrical structure, and an active material forming a continuous or substantially continuous film at least partially encasing the substrate backbone. In some designs, the one or more nanocomposites may comprise a plurality of electrically-interconnected nanocomposites aggregated into a three-dimensional agglomeration, such as a substantially spherical or ellipsoidal granule, for example. The three-dimensional agglomeration may comprise internal pores, which may be left vacant to accommodate volume changes in the active material, or at least partially filled with other materials.

In other embodiments, a method is provided for manufacturing a battery electrode composition. Such a method may include providing one or more planar substrate backbones having a curved geometrical structure, and at least partially encasing each substrate backbone with a continuous or substantially continuous active material film to form one or more composite material nanocomposites. The method may also include aggregating the nanocomposites into a three-dimensional, electrically-interconnected agglomeration, and, in some instances, at least partially filling pores between the nanocomposites in the agglomeration with other materials.

BRIEF DESCRIPTION OF THE DRAWINGS

The accompanying drawings are presented to aid in the description of embodiments of the invention and are provided solely for illustration of the embodiments and not limitation thereof.

FIG. 13A shows sample capacity data (per mass of the composite) and Coulombic Efficiency (CE) data as a function of cycle number, FIG. 13B shows a sample differential capacity plot, and FIG. 13C shows sample charge-discharge profiles for selected cycles.

DETAILED DESCRIPTION

Aspects of the present invention are disclosed in the following description and related drawings directed to specific embodiments of the invention. The term "embodiments of the invention" does not require that all embodiments of the invention include the discussed feature, advantage, process, or mode of operation, and alternate embodiments may be devised without departing from the scope of the invention. Additionally, well-known elements of the invention may not be described in detail or may be omitted so as not to obscure other, more relevant details.

As discussed in the background above, despite the potential for composite electrodes to improve the performance of batteries fabricated from higher capacity materials, conventional composite electrodes have thus far failed to provide adequate functionality. In particular, conventional 3-D micron-sized particle structures tend to exhibit relatively poor ionic conductivity due to their large diffusion distances. Conversely, smaller 0-D nanoparticle structures that provide the fast diffusion needed for high power characteristics and quick charging times tend to suffer from low electrical conductivity and high thermal resistance.

Accordingly, improved nanocomposite material compositions and associated electrodes are provided herein that employ a substantially two-dimensional (2-D) yet curved planar geometry. The planar design provides decreased surface area for a given amount of active material, while maintaining a suitable ion diffusion distance, and the curved geometry ensures sufficient porosity of the electrode. Each of these advantages helps mitigate the low electrical and ionic conductivity characteristic of many higher capacity materials.

Figure 1A:
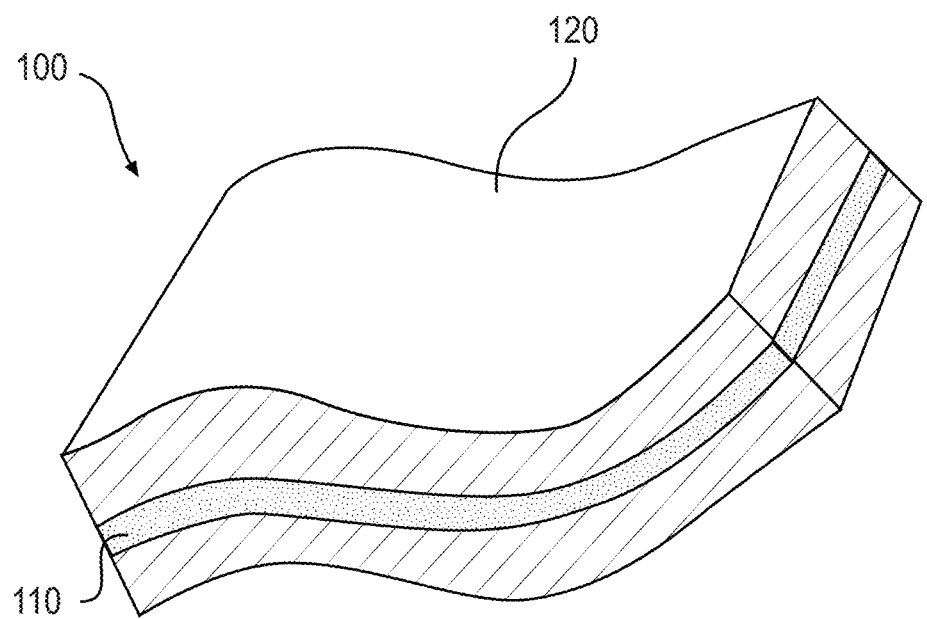
FIGS. 1A-1B are cut-away views that illustrate example nanocomposite structures according to various embodiments.

FIG. 1A is a cut-away view that illustrates an example nanocomposite structure according to one or more embodiments. As shown, a nanocomposite 100 is formed from a planar substrate backbone 110 structured with a curved morphology and an active material 120 forming a continuous or substantially continuous film at least partially encasing the substrate backbone 110. Although a fully continuous film that wholly encases the substrate backbone 110 may be desirable, it will be appreciated that the active material film 120 need not entirely cover the substrate backbone 110 to be operational. Substantial coverage may be sufficient in some designs.

The nanocomposite 100 is planar in the sense that it is generally formed in the 2-D shape of a sheet with a relatively large width-to-thickness aspect ratio, but curved in the sense that, rather than being flat, the sheet is characterized by a non-zero radius of curvature in at least some areas. For example, in some designs, it has been found that the planar morphology of the nanocomposite 100 may be characterized by a width-to-thickness aspect ratio for the substrate backbone 110 in the range of about 10 to about 1,000,000, with an average thickness of the substrate backbone 110 in the range of about 0.2 nm to about 100 nm. In addition, in some designs, it has been found that the curved morphology of the substrate backbone 110 may be characterized by a radius of curvature in the range of about 0.3 nm to about 0.03 mm.

The curved planar geometry reduces the surface area of the nanocomposite 100 for a given active material mass and a given maximum diffusion distance, as compared to conventional designs. A low surface area is important for reducing exposure of the active material 120 to the battery electrolyte, and hence, for reducing degradation of the electrode. In particular, a low surface area leads to a correspondingly smaller total mass and volume of the solid-electrolyte interphase (SEI), which often forms upon electrolyte decomposition (on initial charging) at the boundary between the active material and the electrolyte mixture in each cell. The formation of the SEI acts as a barrier to further electrolyte decomposition. This decomposition occurs via electrochemical reactions (e.g., commonly reduction of the electrolyte on the anode or oxidation of the electrolyte on the cathode of a battery, such as a Li-ion battery) at the interface between the active material and certain solvent molecules present in the electrolyte. If the SEI fails to sufficiently suppress such electrolyte decomposition during battery operation, rapid battery degradation may occur.

The SEI is routinely subjected to various chemical as well as physical degradation processes throughout a cell's operation, however, which may cause it to become either electrically conductive or substantially permeable to solvent molecules. This, in turn, causes further electrolyte decomposition and SEI growth, significantly decreasing battery lifetime as well as energy and power characteristics. Decreasing the overall volume of the SEI reduces the total irreversible capacity losses. Decreasing the surface area of the SEI (for a fixed thickness) not only decreases the total SEI volume within the electrode, but also decreases the probability that a void or other defect will occur over the SEI surface that would allow electrolyte solvent molecules to come into contact with the active material at an undesirably fast rate. Decreasing the SEI surface area further decreases the average flux of solvent molecules slowly permeating through the SEI, which causes the eventual decomposition irreversible losses. In practice, the diffusion of solvent molecules through the SEI cannot be infinitely slow, but it is desirable for this diffusion process to be as slow as possible or practical. Finally, decreasing the total area of the active material exposed to the electrolyte decreases the rate of any other unwanted chemical reactions.

The curved planar geometry of the nanocomposite 100 described herein provides a smaller SEI for a given active material mass as compared to conventional designs. Additionally, the curved planar geometry may lead to enhanced SEI stability and improved performance as a barrier for the unwanted reactions and diffusion of electrolyte solvent molecules.

At the same time, the curved planar geometry also maintains a suitably small diffusion distance for a given active material mass. The diffusion distance over which active ions (e.g., Li ions in a Li-ion battery) must travel during insertion into and extraction from the active material upon charge cycling of the battery is an important factor in providing quick charging times and suitable power characteristics. If the active ions have to travel too far into or out of the active material, charging and discharging times will suffer.

In some embodiments, for active materials with low electrical conductivities, the active material 120 may be deposited on an electrically conductive material used as the substrate backbone 110 to minimize the resistance for electrons moving to (or from) the desired electrochemical reaction site from (or to) the electrically conductive backbone 110 during battery charging or discharging. In other embodiments, if the substrate backbone 110 is not electrically conductive and the active material 120 also does not have high electrical conductivity, an additional coating of an electrically conductive and ionically permeable layer may be provided on the surface of the active material 120.

Figure 1B:
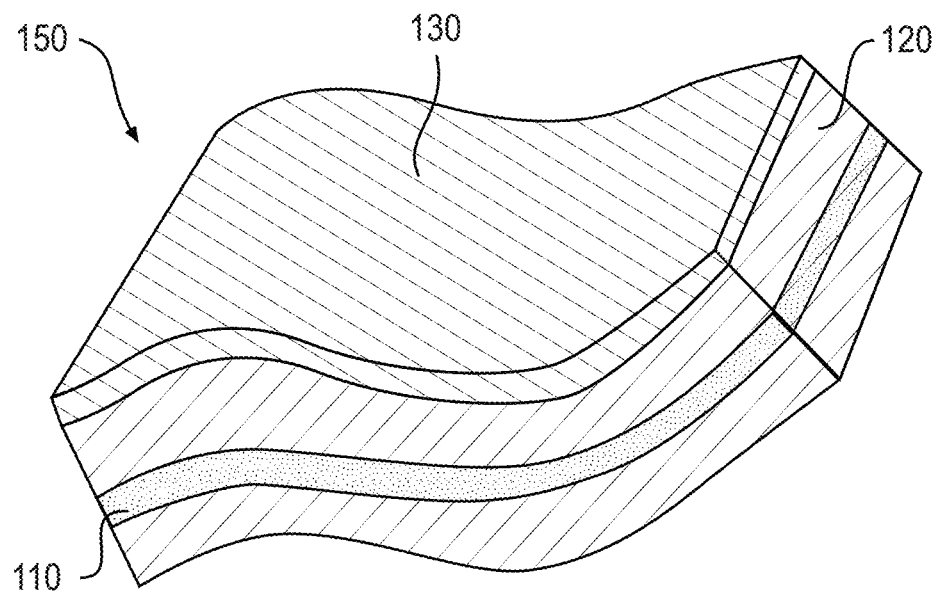

FIG. 1B is a cut-away view that illustrates an example nanocomposite structure having an additional coating of this type according to one or more embodiments. As in FIG. 1A, the nanocomposite 150 in the design of FIG. 1B is formed from a planar substrate backbone 110 structured with a curved morphology and an active material 120 forming a continuous or substantially continuous film at least partially encasing the substrate backbone 110. However, the nanocomposite 150 additionally includes an outer coating 130 at least partially covering the surface of the active material 120. Carbon is one example of a material that may be used for such a coating, but other electrically conductive and ionically permeable materials may also be used. In this case, during electrochemical reaction (charge or discharge of a battery), both ions and electrons permeate toward the electrochemical reaction sites within the active material 120 through the surface of the outer coating 130. The curved planar geometry in this design similarly reduces the diffusion distance for both ions and electrons for a given external surface area of the active material 120, while the outer coating 130 helps improve electrical conductivity.

Conventionally, a small diffusion distance has been achieved by constructing so-called 0-D nanoparticles, as discussed above. However, nanoparticles tend to suffer from low electrical conductivity due to increased particle-to-particle resistances, which causes generation of heat during high current pulses within the battery, and, perhaps more importantly from a safety perspective, nanoparticles tend to suffer from high thermal resistance because of the high phonon scattering taking place at the point contacts between nanoparticles. By contrast, the curved planar geometry of the nanocomposites described herein is able to provide a suitably small diffusion distance for a given active material mass by spreading the active material out in a thin film over the substrate backbone, as well as provide significantly better electrical conductivity and thermal transport properties. This ensures that more of the active material remains close to the structure's surface, without encountering the drawbacks associated with the small size of conventional nanoparticles.

Again though, this is achieved without dramatic increases in surface area, which leads to the degradation problems discussed above. Other conventional approaches such as 1-D nanowire structures, for example, have a much higher surface area for the same diffusion distance, and suffer from other problems including gaps that form between the nanowires.

The curved planar geometry is also often able to better accommodate volume changes during battery operation.

This is important for some higher capacity active materials such as silicon, which experience significant volume fluctuations (up to 400% for some materials) during insertion and extraction of active ions, such as lithium (Li) in a Li-ion battery. SEI stability in particular, and its resistance against permeation of electrolyte solvent molecules and other harmful components, can be compromised by the large volume changes in silicon during lithium insertion/extraction, as the outer surface area is continually expanded and contracted. This expansion/contraction typically causes the formation of SEI defects and voids, which lead to the degradation of its resistance to electrolyte solvent permeation and thus to irreversible capacity losses, SEI growth, and the resultant decrease in both energy and power characteristics of the battery. The low elasticity of the SEI makes it difficult to achieve long-term stability under cycling load for designs that strongly correlate changes in volume with changes in outer surface area.

Conventional 0-D, 1-D, and 3-D composites strongly correlate changes in volume with changes in outer surface area, and are accordingly susceptible to the type of SEI defects and voids described above. Silicon nanoparticles and nanowires, for example, experience very large external surface area changes during insertion/extraction of lithium. Silicon nanoparticles in particular expand uniformly in all dimensions, and thus their outer surface area (where the SEI forms) changes dramatically during insertion/extraction of lithium.

By contrast, the inventors of the present application have shown that the curved planar geometry of the nanocomposites described herein is able to accommodate volume swelling primarily through changes in thickness. This is advantageous because changes in thickness are relatively decoupled from changes in outer surface area. Because the outer surface area is able to remain substantially constant during ion insertion/extraction, the nanocomposites described herein are more easily able to maintain stability of the SEI, ensuring that it remains impermeable for solvent molecules, becomes electrically insulating, maintains good adhesion, and so forth.

Returning to FIGS. 1A and 1B, the substrate backbone 110 providing the foundation for the curved planar geometry may be formed from a variety of materials. In general, any curved, thin 2-D substrate that does not react with precursors of the active material 120 may be used.

One example material for the substrate backbone 110 is graphene. Graphene is an allotrope of carbon and may be structured in one or more atom-thick planar sheets or layers of $sp^2$-bonded carbon atoms densely packed in a honeycomb crystal lattice. The high surface area of graphene relative to its size (i.e., its specific surface area) allows rapid active material deposition, which may be advantageous for certain practical applications and manufacturing considerations.

Figure 2:
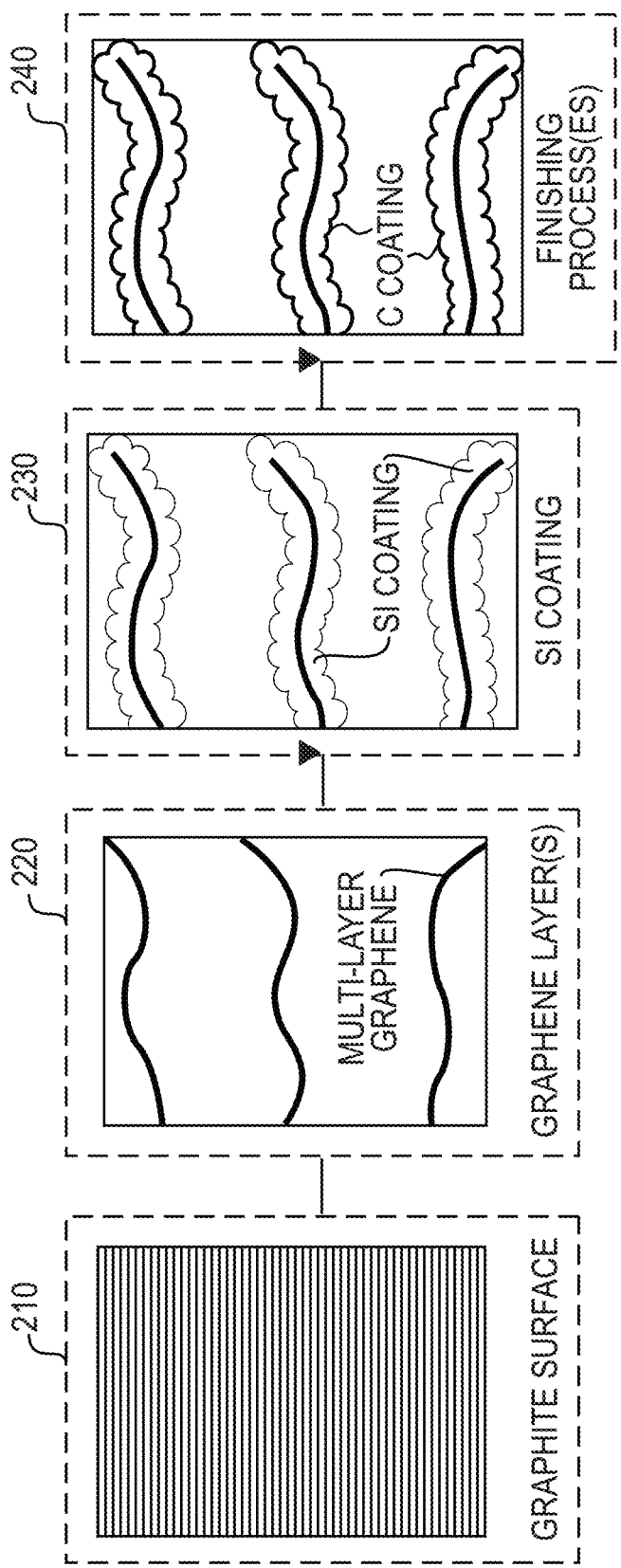
FIG. 2 is a graphical flow diagram depicting the formation of an example silicon-based nanocomposite structure using a graphene substrate backbone according to a particular embodiment.

FIG. 2 is a graphical flow diagram depicting the formation of an example silicon-based nanocomposite structure using a graphene substrate backbone according to a particular embodiment. In this example, formation begins with the exfoliation and shearing of a natural graphite starting material or the like (block 210) to produce graphene (block 220). Mechanical shearing, for example, may be used to produce graphene of very high quality. For better process scalability, however, ultrasonic shearing may alternatively be used for graphene production with a significantly higher yield. Other exfoliation and shearing procedures as known the art may also be used.

In one particular example, a natural graphite powder may be initially immersed in concentrated sulfuric acid for a given duration (e.g., about two hours has been found to be sufficient). The subsequently dried product may then be subjected to thermal shock treatment at elevated temperature (e.g., about 1,000° C.) for a given duration (e.g., about 30 seconds) to obtain exfoliated graphite worms. The exfoliated graphite worms may then be dispersed in deionized water and subjected to extensive ultrasonication treatment to break down the graphite flakes and separate the graphene sheets. The dried product, graphene oxide, may be reduced at elevated temperature (e.g., about 800° C.) in a gaseous stream such as $H_2$ for about one hour to obtain a graphene powder.

Returning to FIG. 2, the produced graphene may then be uniformly coated with the desired active material (block 230). For the silicon active material in this example, the coating may be achieved via silane ($SiH_4$) decomposition at elevated temperature or in other ways as desired. For example, low pressure decomposition of a high purity $SiH_4$ at 500° C. may be utilized to deposit silicon onto graphene. As discussed above, in contrast to nanoparticles, the thicker nanocomposite structures that may be produced in this manner provide a lower surface area for a given mass, and better potential for reducing the irreversible capacity losses experienced upon the first and subsequent cycles of the resultant battery.

Other finishing steps may be performed as desired for particular applications. Here, a thin layer of amorphous carbon is deposited (block 240) similar to the design of FIG. 1B, by way of example, to reduce silicon oxidation, improve anode stability, and increase anode electrical conductivity and battery power characteristics. The carbon coating may be deposited, for example, via atmospheric pressure decomposition of a carbon precursor (e.g., $C_3H_6$) at elevated temperature (e.g., at about 600-1000° C.) for a given duration (e.g., for about 5-50 minutes). In some processes, it may be desirable to place a mineral oil bubbler in line with the gas exhaust line to avoid oxidation caused by the backstream diffusion of oxygen or oxygen-containing molecules from the exhaust side. In this way, a composite containing about 60 wt. % silicon may be produced. Silicon and carbon contents may be calculated via mass change measurements, for example, after corresponding depositions, and verified using thermogravimetric analysis or equivalent procedures. Particular example fabrications and their characterizations are described later.

One of the advantages of using graphene as the substrate backbone is that it may be formed as a single layer or as multiple layers. Further, according to various embodiments, the thickness and distance between the graphene layers may be tuned to adjust the thickness of the deposited active material film. Thicker films of active material generally provide higher capacity but slower charge transfer rates, while thinner films generally provide more rapid charging and higher power performance. In this way, the tunable spacing between individual graphene layers provides for active material film depositions of various thicknesses, and thus, optimization of the nanocomposite for either high energy or high power applications.

Other materials may also be used to form the substrate backbone 110 providing the foundation for the curved planar geometry. Examples of such curved layered or planar materials include but are not limited to various clay minerals (e.g., $Al(OH)_3$, $Mg(OH)_2$), exfoliated boron nitride (BN), exfoliated molybdenum disulfide ($MoS_2$), exfoliated tungsten disulfide ($WS_2$), bismuth telluride ($Bi_2Te_3$), exfoliated layered ternary carbides (e.g., $Ti_2SiC_2$), and others.

A variety of active materials may be advantageously structured in the curved planar geometry nanocomposites described herein, including not only silicon (Si) discussed above and similar materials that experience significant volume changes (e.g., greater than about 5%), but also other materials where volume change accommodation is not of concern. The curved planar geometry of the nanocomposites described herein is beneficial and provides good electrical and thermal conductivity for a wide range of active cathode and anode materials for Li-ion and other batteries.

Among anodes, examples of such materials include: (i) heavily (and "ultra-heavily") doped silicon; (ii) group IV elements; (iii) binary silicon alloys (or mixtures) with metals; (iv) ternary silicon alloys (or mixtures) with metals; and (v) other metals and metal alloys that form alloys with lithium.

Heavily and ultra-heavily doped silicon include silicon doped with a high content of Group III elements, such as boron (B), aluminum (Al), gallium (Ga), indium (In), or thallium (Tl), or a high content of Group V elements, such as nitrogen (N), phosphorus (P), arsenic (As), antimony (Sb), or bismuth (Bi). By "heavily doped" and "ultra-heavily doped," it will be understood that the content of doping atoms is typically in the range of about 3,000 parts per million (ppm) to about 700,000 ppm, or approximately 0.3% to 70% of the total composition.

Group IV elements used to form higher capacity anode materials may include Ge, Sn, Pb, and their alloys, mixtures, or composites, with the general formula of $Si_a$—$Ge_b$—$Sn_c$—$Pb_d$—$C_e$-$D_f$, where a, b, c, d, e, and f may be zero or non-zero, and where D is a dopant selected from Group III or Group V of the periodic table.

For binary silicon alloys (or mixtures) with metals, the silicon content may be in the range of approximately 20% to 99.7%. Examples of such as alloys (or mixtures) include, but are not limited to: Mg—Si, Ca—Si, Sc—Si, Ti—Si, V—Si, Cr—Si, Mn—Si, Fe—Si, Co—Si, Ni—Si, Cu—Si, Zn—Si, Sr—Si, Y—Si, Zr—Si, Nb—Si, Mo—Si, Tc—Si, Ru—Si, Rh—Si, Pd—Si, Ag—Si, Cd—Si, Ba—Si, Hf—Si, Ta—Si, and W—Si. Such binary alloys may be doped (or heavily doped) with Group III and Group V elements. Alternatively, other Group IV elements may be used instead of silicon to form similar alloys or mixtures with metals. A combination of various Group IV elements may also used to form such alloys or mixtures with metals.

For ternary silicon alloys (or mixtures) with metals, the silicon content may also be in the range of approximately 20% to 99.7%. Such ternary alloys may be doped (or heavily doped) with Group III and Group V elements. Other Group IV elements may also be used instead of silicon to form such alloys or mixtures with metals. Alternatively, other Group IV elements may be used instead of silicon to form similar alloys or mixtures with metals. A combination of various Group IV elements may also be used to form such alloys or mixtures with metals.

Examples of other metals and metal alloys that form alloys with lithium include, but are not limited to, Mg, Al, Ga, In, Ag, Zn, Cd, etc., as well as various combinations formed from these metals, their oxides, etc.

Examples of cathode active materials that may benefit from the curved planar geometry nanocomposites described herein include: various fluorides, various iodides, various oxides, various oxy-halides, various phosphates, various sulfides, sulfur, iodine and various other sulfur-containing compounds, among other materials, and their various mixtures.

Turning now to the larger structure of the electrode itself, electrodes according to various embodiments herein may be formed from a plurality of nanocomposite "building blocks" agglomerated or assembled together. That is, the curved planar geometry nanocomposites described above may be assembled into 3-D agglomerates of various forms that provide good thermal transfer properties as well as good electrical conductivity. For example, the agglomerates can be assembled in the form of a bulk unitary body that adopts the ultimate shape of the electrode. Alternatively, the agglomerates can be assembled in the form of a specially shaped granule, which can be packed together in close proximity with other such granules to form the electrode. A polymer binder may be used to hold these granules together and attach them to the surface of a current collector.

Figure 3A:
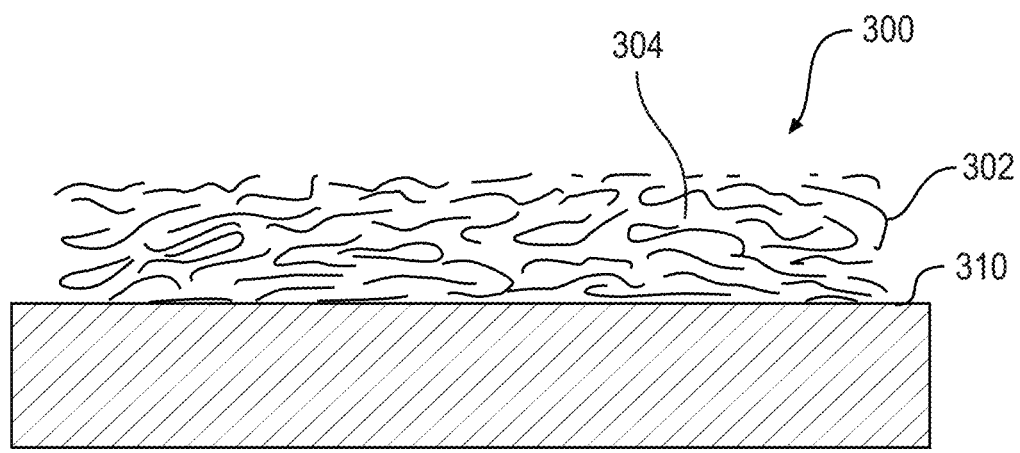
FIGS. 3A-3B illustrate example 3-D agglomerate structures according to various embodiments.

FIG. 3A illustrates an example 3-D agglomerate structure according to a particular embodiment. In this example, the 3-D agglomerate structure 300 includes a plurality of nanocomposites 302 with pores or voids 304 therebetween, and is simply assembled in the form of a bulk unitary body that adopts the shape of the underlying current collector 310 of the electrode.

Figure 3B:
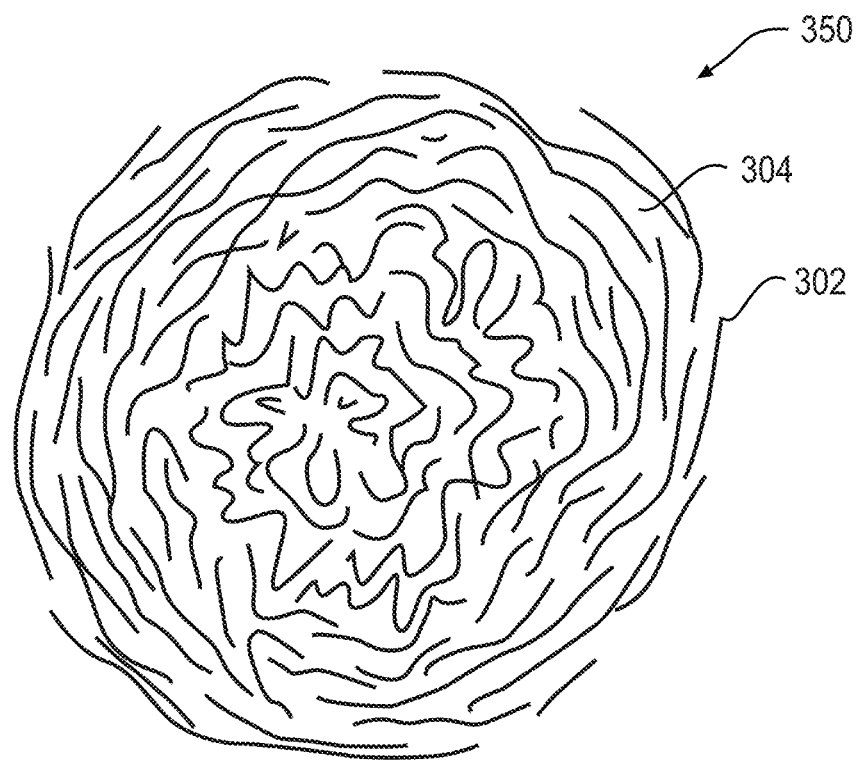

FIG. 3B illustrates an example 3-D agglomerate structure according to another embodiment. In this example, the 3-D agglomerate structure 350 also includes a plurality of nanocomposites 302 with pores or voids 304 therebetween, but is shaped as a generally spherical granule. It will be appreciated, however, that other shapes may be created as desired for a particular application, such as an ellipse, an ellipsoid, a rod, or other shapes. It will further be appreciated that while terms like "spherical" and "ellipsoidal," for example, are used to describe the shape of such a 3-D structure, these terms are not intended to convey or in any way require that the agglomerates take on a mathematically precise geometric figure. These terms are only used to convey the general shape for illustration purposes. It will be appreciated that, in practice, the 3-D agglomerate structure 350, for example, may simply be substantially round, and not precisely spherical or even ellipsoidal.

Each individual nanocomposite 302 within the agglomerates 300, 350 is assembled in such a manner as to be in electrical communication with at least one other nanocomposite 302. In some designs, this may be accomplished simply by forming the agglomeration in such a way that at least an electrically conductive portion of each nanocomposite 302 is in contact with at least an electrically conductive portion of another nanocomposite 302. In other designs, an additional electrically or ionically conductive coating may be applied to the surface of each nanocomposite 302, such as via the outer coating 130 shown in FIG. 1B. For example, vapor deposited carbon or carbon produced by a decomposition of hydrocarbons or various organic compounds may be used in various embodiments to electrically connect the individual building block nanocomposites 302 within the agglomerates 300, 350.

Alternatively or in addition, an electrically conducting additive can be used to ensure that the different nanocomposites 302 are in sufficient electrical contact with one another. One example of such an electrically conductive additive is carbon, which can be produced from a sacrificial organic binder that converts primarily to carbon during fabrication and prior to assembly of the electrode. Exemplary binders include polymeric materials having at least about 20 atomic percent carbon in the monomeric unit used to form the polymer. Suitable polymers include but are not limited to sucrose, carbonates, petroleum pitch, olyethers, polyesters, polymers based on methyl methacrylate, polymers based on acrylonitrile, polymers based on vinylidene fluoride, and the like. Other electrically conductive additives for such purposes include conductive polymers, and are known to those skilled in the art to which this disclosure pertains. In this manner, the electrical conductivity of the electrode is not unnecessarily hindered by the surface resistance at nanocomposite-nanocomposite boundaries. Similarly, when the electrode comprises a plurality of agglomerated granules, the granules may be packed or arranged into a matrix in such a manner as to have each granule in electrical communication with at least one other granule, and, in some designs, a further conductive additive may be added therebetween.

As discussed above, the individual nanocomposites in the agglomerated structures are themselves advantageously able to absorb volume changes associated with certain active materials in an efficient manner with respect to changes in surface area. Similarly, in some examples the curved shape of the 2-D nanocomposites creates pores within the larger agglomerated structure, as shown, for example, in FIGS. 3A and 3B by the pores 304. The additional volume provided by the pores provides further space for active material expansion and contraction during ion insertion and extraction, respectively. Accordingly, regardless of how the nanocomposites are assembled, the curved shape of each nanocomposite ensures that the anode will maintain at least some level of porosity between the layers of active material. The exact porosity of the electrode will depend, at least in part, on the particular structure of the individual nanocomposites. As will be discussed in more detail below, these properties may be adjusted according to various embodiments to achieve a desired porosity for a given application.

Generally though, the available pore volume can be made sufficiently large to accommodate active material expansion and contraction during charge cycling (e.g., in some cases up to about five times the volume of the active material in the agglomerated nanocomposites). This threshold pore space prevents the electrode from experiencing strain as a result of active material swelling. In order to minimize any adverse effects on the volumetric performance of the electrode, it may be desired to limit the pore volume to less than about 90% of the total volume of the agglomerate. It has been found that when the pore volume is greater than about 90% of the total geometrical volume of silicon nanocomposite aggregates, for example, the volumetric capacitance of the anode may begin to suffer.

In some embodiments, the voids or pores between the layers of active material may be at least partially filled with an ionically conductive material, such as a solid electrolyte or an active material with significantly higher ionic conductivity (but suffering, for example, from high cost or low capacity or other limitations). In some embodiments, this pore-filling material may have mixed (electronic and ionic) conductivity.

As discussed above, other types of active materials that do not experience significant volume changes may also be advantageously structured in the form of the nanocomposites and the agglomerations of nanocomposites described herein. For materials without significant expansion or contraction, the porosity may be made small to increase volumetric capacity. Alternatively, however, the pores between the agglomerated nanocomposites may be repurposed to enhance other properties of the resultant electrode. For example, similar to the pore-filling described above, the pores 304 shown in FIGS. 3A and 3B may be completely or partially filled with an ion-conducting material such as a solid electrolyte to enhance ionic conductivity.

In some embodiments, this solid electrolyte can be a polymer electrolyte. Polymer electrolytes differ from the liquid electrolytes commonly used in Li-ion battery cells. Rather than holding a lithium-salt electrolyte in a liquid organic solvent, polymer electrolytes use a solid polymer composite such as polyethylene oxide or polyacrylonitrile. Polymer electrolytes have garnered significant interest as a replacement to conventional liquid electrolytes because of their potentially lower cost of manufacture, adaptability to a wide variety of packaging shapes, reliability, ruggedness, and, perhaps more importantly, enhanced safety. Polymer electrolytes may, in some designs, produce a more stable SEI than liquid electrolytes. However, despite these potential advantages, they have proven impractical for a number of reasons.

In particular, polymer electrolytes cannot be formed into thin layers and must be made substantially thicker than their liquid electrolyte counterparts, often an order of magnitude or more, which significantly increases the diffusion distance for active ions such as lithium. Diffusion through a polymer electrolyte is therefore often ten times slower than diffusion through a liquid electrolyte in the same cell, and, in many practical applications, even slower. Although slow diffusion may actually be a benefit to certain applications in which safety is a priority, it severely impedes the use of polymer electrolytes for higher power applications.

The pores 304 created by the nanocomposite agglomerations 300, 350 provide a substantially isolated region in the cell in which to employ polymer electrolytes without the conventional drawbacks typically associated with their use. In this way, each type of electrolyte may be used in the area for which it is best suited, offering the best of both worlds by providing a combination of polymer electrolytes within the active electrode material agglomerates and liquid electrolytes elsewhere throughout the cell. Such a design provides fast ion transfer properties within the electrode, fast electron transfer properties within the agglomerate, a diffusion distance through the active material that remains substantially small, and so forth, leading to fast power characteristics while at the same time advantageously maintaining a large effective particle size.

Charging and discharging of a battery (including a Li-ion battery) during its operation requires access of both electrolyte ions and electrons to the reaction sites of the active material. Therefore, minimizing the resistance faced by both ions and electrons traveling to each reaction site is particularly important for maintaining high power performance. Further, the surface area in such a design remains moderate, as discussed above, which is advantageous for battery safety, as a high surface area more easily leads to thermal runaway, which, combined with the poor thermal conductivity of conventional designs, stores heat inside the cell and may render it unsafe.

In other embodiments, the solid electrolyte that at least partially fills the pores 304 may be a ceramic-based electrolyte. Ceramic-based electrolytes are highly resistant to decomposing at the interface with the active material, they provide very safe operation, and they provide a relatively long cycle life. For reasons similar to those described above for a polymer electrolyte, it may be beneficial in certain embodiments for both cost and performance reasons to use a liquid electrolyte between the agglomerates and a ceramic electrolyte within the agglomerates.

In still other embodiments, the pores 304 may be at least partially filled with a hybrid of two types of materials employed together in the same design—one with high electrical conductivity (e.g., on the order of $10^{-8}$ S cm$^{-1}$ or better) and another with high ionic conductivity (e.g., on the order of $10^{-8}$ S cm$^{-1}$ or better), for example. In some designs, it may be advantageous to use a first ion-permeable and electrically conductive material covering the surface of the active material layer and a second ionically conductive but electrically insulative material covering at least a portion of the surface of the electrically conductive material. In some designs, it may be further advantageous to make the second ionically conductive but electrically insulative material permeable only to electrolyte ions but have very small (if any) permeability to electrolyte solvent molecules. This type of design helps to prevent or at least limit the solvent molecules from reaching the surface of the active material and decomposing.

In still other embodiments, the pores 304 may be at least partially filled with a material having a high mixed (electrical and ionic) conductivity. For example, in some designs, when the filling of pores is incomplete, it may be advantageous to make the second ionically conductive but electrically insulative material discussed above, covering at least a portion of the surface of the first material, have a mixed conductivity. In some designs, it may be further advantageous to make the second ionically conductive but electrically insulative material permeable only to electrolyte ions but have very small (if any) permeability to electrolyte solvent molecules. Again, this type of design helps to prevent or at least limit the solvent molecules from decomposing.

As mentioned above, the density of the pores 304 created by the nanocomposite agglomerations 300, 350 may also be tailored according to various embodiments to trade off one or more of the performance characteristics of the cell, as desired for a particular application. For example, the pore density or pore size can be adjusted to reduce overall pore volume, while still ensuring that pore volume (in some designs, filled with a liquid or solid electrolyte or with a highly conductive material) is large enough for the ions to propagate at a desirable rate. This may be advantageous because most active materials do not have a high electrical or ionic conductivity.

One example mechanism by which the porosity can be adjusted is to change the shape and associated curvature of the individual nanocomposites making up the agglomerations.

Figure 4A:
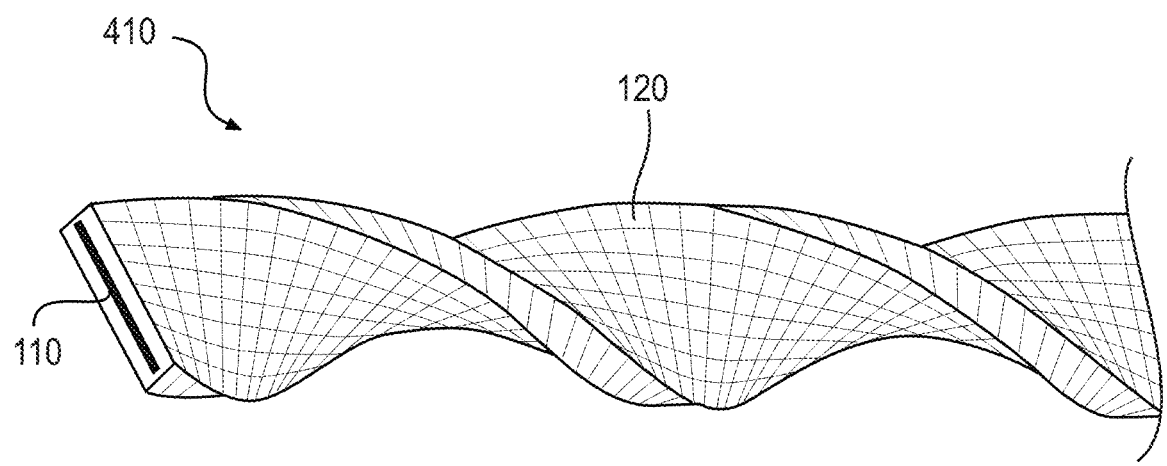
FIGS. 4A-4D illustrate several example curved planar nanocomposite shapes according to various embodiments.
Figure 4B:
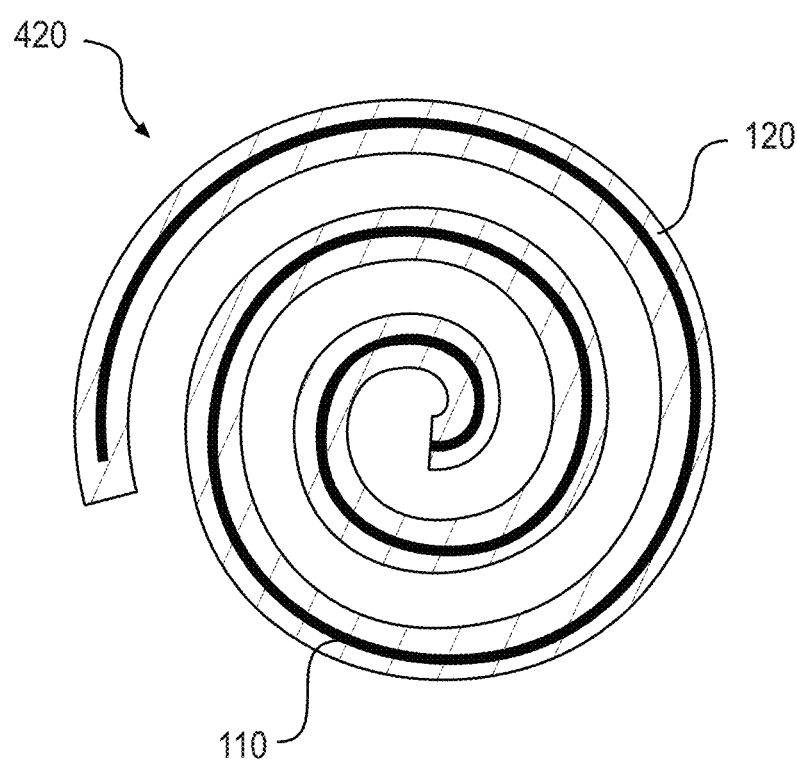
Figure 4C:
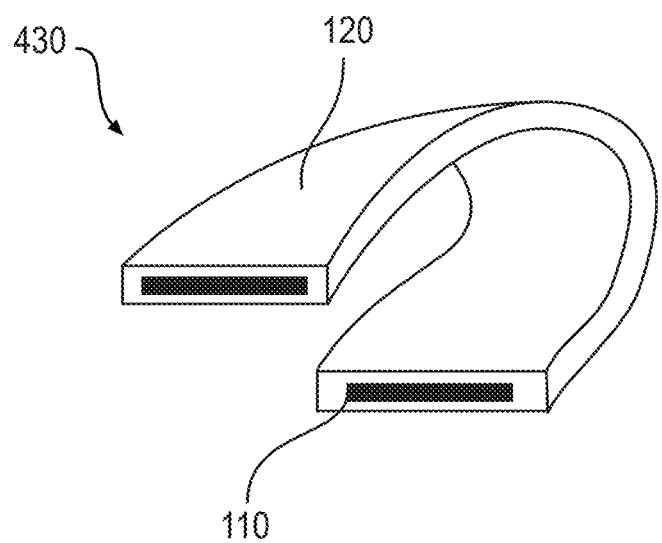
Figure 4D:
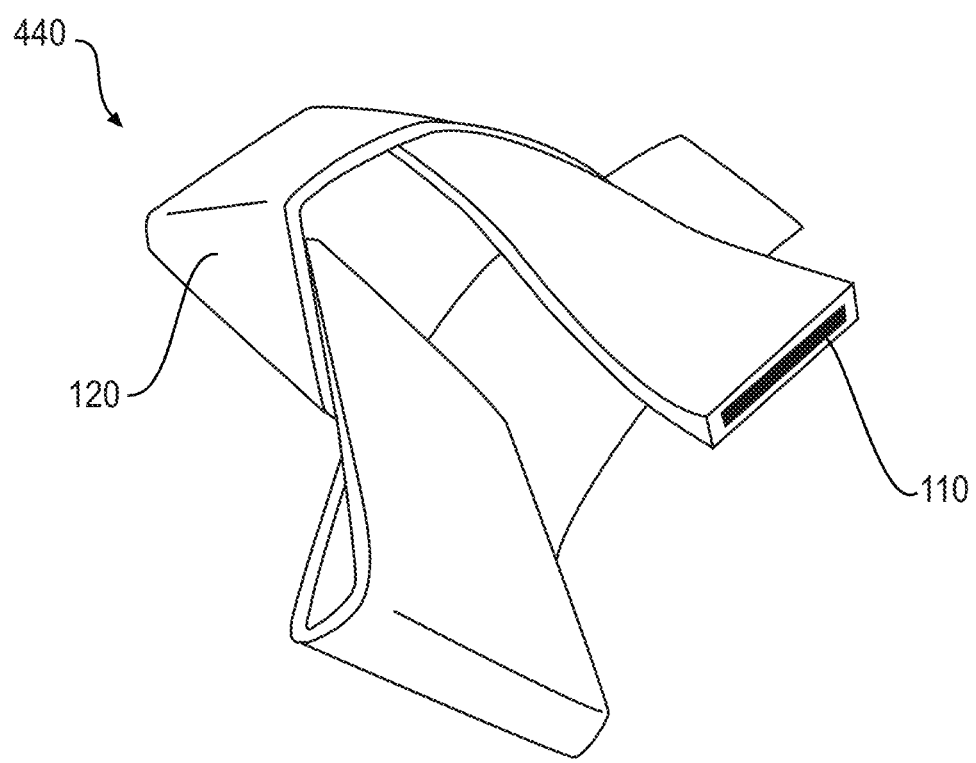

FIGS. 4A-4D illustrate several example curved planar nanocomposite shapes according to various embodiments. FIG. 4A illustrates a particular example design in which the substrate backbone 110 is twisted to form a helix or spiral shaped nanocomposite 410. FIG. 4B illustrates another particular example design in which the substrate backbone 110 is rolled up to form a different spiral shaped nanocomposite 420. FIG. 4C illustrates another particular example design in which the substrate backbone 110 is curled to form a horseshoe shaped nanocomposite 430. FIG. 4D illustrates another particular example design in which the substrate backbone 110 is contorted to form a more arbitrarily shaped nanocomposite 440. For simplicity, the outer coating 130 is omitted from the illustrations in FIGS. 4A-4D, but it will appreciated that one may employed as desired.

In any case, it has been found that designs in which the square root of the external surface area of the nanocomposite exceeds the nanocomposite thicknesses by an order of magnitude or more provide good performance. It has also been found that designs in which the nanocomposite thickness ranges from about 0.003 µm to about 0.5 µm provide good performance.

In some embodiments, electrode stability may be further enhanced by the application of an additional protective coating to the surface of the active material film. The protective coating may be formed from or otherwise include material specially selected to reduce or prevent degradation of the active material. Examples of such protective coating materials may include select polymers, oxides, halides (such as fluorides or chlorides), oxyhalides (such as oxyfluorides or oxychlorides), carbon, sulfides, combinations thereof, or other materials. Such a coating should be permeable to ions inserted into or extracted from the active material, such as lithium ions in the case of Li-ion batteries. Desirably, and in at least in some designs, the protective coating is made resistant (if not impermeable) to infiltration by the electrolyte solvents as well, which again are a leading contributor to the degradation of the electrolyte and irreversible capacity losses within the battery.

Figure 5:
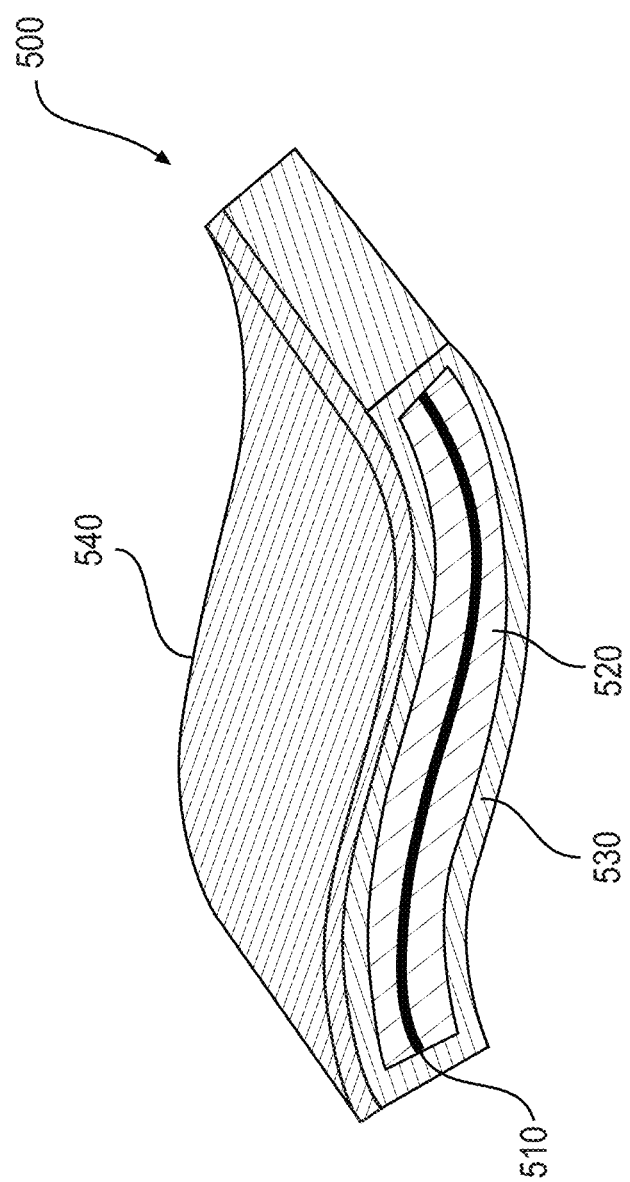
FIG. 5 illustrates an example nanocomposite and protective coating arrangement according to one or more embodiments.

FIG. 5 illustrates an example nanocomposite and protective coating arrangement according to one or more embodiments. In this example, similar to the example of FIG. 1B, the nanocomposite 500 includes a planar substrate backbone 510, an active material layer 520, and (in some designs) an outer coating 530. A generic planar shape for the nanocomposite 500 is shown in FIG. 5 for illustration purposes, but it will be appreciated that any suitable shape may be employed as desired, several examples of which are given above.

As shown, the nanocomposite 500 further includes a protective coating 540 that at least partially encases the nanocomposite 500. As shown, the protective coating 540 may be adhered onto the surface of the nanocomposite 500 and act as a barrier to the electrolyte solvents contained therein (while remaining permeable to, for example, lithium ions), preventing it from deteriorating the underlying active material 520. As discussed above, the protective coating 540 may be formed from select polymers, oxides, fluorides, carbon, sulfides, combinations thereof, or other materials.

In some embodiments, the protective coating is made flexible so that it can generally expand and contract with the active material during ion insertion and ion extraction. For example, the protective coating may be made from a polymer chain that is able to slide over itself. Other examples include metals that naturally form protective oxide layers on their surfaces. These include, but are not limited to oxides of aluminum (Al), titanium (Ti), chromium (Cr), tantalum (Ta), niobium (Nb), and other metals or semimetals. Deposition of such coatings can be performed using a variety of oxide coating deposition techniques, including physical vapor deposition, chemical vapor deposition, magnetron sputtering, atomic layer deposition, microwave-assisted deposition, wet chemistry, and others. Deposition of fluoride, sulfide, and other types of protective coatings as well as solid electrolyte coatings on the surface of the curved 2D active material can be produced using similar techniques.

As discussed above, wet chemistry methods can be employed to produce metal oxide protective coatings. For example, metal oxide precursors in the form of a water-soluble salt may be added to the suspension (in water) of the nanocomposites to be coated. The addition of the base (e.g., sodium hydroxide or amine) causes formation of a metal (Me) hydroxide. Active nanocomposites suspended in the mixture may then act as nucleation sites for Me-hydroxide precipitation. Once the nanocomposites are coated with a shell of Me-hydroxide, they can be annealed in order to convert the hydroxide shell into a corresponding oxide layer that is then well-adhered to the nanocomposite surface.

In other examples, an aluminum oxide coating may be produced using wet chemistry techniques according to the following or similar steps: (i) dissolving aluminum isopropoxide in ethanol; (ii) drying the solution in the presence of active silicon particles; and (iii) annealing to transform the aluminum isopropoxide coating into an aluminum oxide coating. In still other examples, an iron fluoride coating may be produced using wet chemistry techniques according to the following or similar steps: (i) dissolving iron (Fe) powder in an aqueous solution of fluorosilicic acid; (ii) drying the solution in the presence of active silicon particles to form a coating composed of $FeSiF_6.H_2O$; and (iii) transforming the $FeSiF_6.H_2O$ into iron fluoride ($FeF_x$) by annealing the coated powder in an inert environment, such as argon gas or in vacuum.

The formation of a sufficiently flexible protective coating may be advantageous for certain active materials like silicon that exhibit an increase, and subsequent decrease, in volume of up to about 300% during cycling. Flexibility of the protective coating guards against the formation of cracks or voids that would otherwise allow harmful particles to penetrate through to the active material.

In other embodiments, however, it has been found that the use of a mechanically stable and plastically deformable protective coating may provide further advantages when appropriately deployed. For example, a shell structure may be used to coat or encase the nanocomposite surface. During the initial insertion (e.g., the first cycle of a Li-ion battery), the outer surface area of such a protective coating may be plastically deformed and expand to match the expanded state of the lithiated nanocomposite. However, upon lithium extraction, this type of protective coating remains mechanically stable and largely retains its expanded state. In this way, a shell structure is created that fits the nanocomposite in the expanded lithiated state, but allows for contraction of the active material core during delithiation without fracturing.

Figure 6:
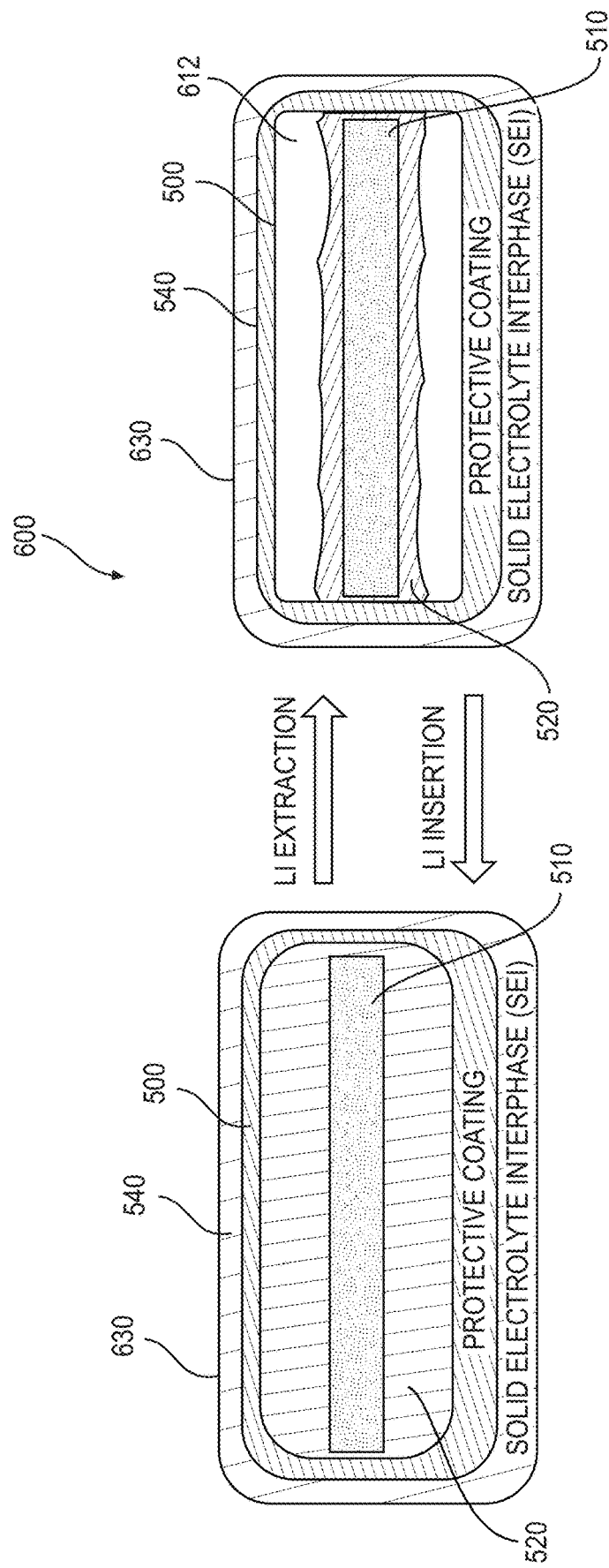
FIG. 6 is a cross-sectional view illustrating the lithiation and delithiation of an example shell structure protective coating arrangement according to one or more embodiments.

FIG. 6 is a cross-sectional view illustrating the lithiation and delithiation of an example shell structure protective coating arrangement according to one or more embodiments. In this example, the nanocomposite 500 is designed as shown in FIG. 5, including a planar substrate backbone 510 and an active material 520, with the protective coating 540 being, in this case, a plastically deformable yet mechanically stable shell structure. For simplicity, the outer coating 530 is omitted from the illustration in FIG. 6, but it will be appreciated that one may be employed as desired.

Here, the shell structure is designed such that, at least after an initial cycling period, voids or pockets 612 are formed inside the protective coating 540 (in the delithiated state) that provide space for the active material 520 to expand during lithiation. In this way, the outer surface area of the protective coating 540 may remain substantially stable throughout the subsequent cycles of silicon-lithium expansion (during lithium insertion) and compaction (during lithium extraction) as part of normal battery operation.

An SEI layer 630 is also shown in FIG. 6 to illustrate how it is formed (on initial charging) over the protective coating 540 rather than directly on the surface of the active material 520 as it otherwise would. As discussed above, SEI stability and resistance against permeation of solvent molecules and other harmful components can be compromised by the large volume changes in certain active materials during lithium insertion/extraction, as its outer surface area is continually expanded and contracted, which typically causes the formation of SEI defects and voids, leading to the degradation of its resistance to solvent molecule permeation. However, with the shell protective coating in the design of FIG. 6 providing a more stable outer surface area for the SEI 630 to form on, the mechanical stability of the SEI layer 630 may be enhanced. A more stable SEI layer 630 provides additional protections against various degradation processes.

In some embodiments, a ceramic coating material may be used to form the shell structure for the protective coating 540. Examples of ceramic coatings include, but are not limited to: various sulfides, aluminum oxide or lithiated aluminum oxide, titanium oxide or lithiated titanium oxide, zinc oxide or lithiated zinc oxide, niobium oxide or lithiated niobium oxide, and tantalum oxide or lithiated tantalum oxide. Other examples of ceramic coatings include, but are not limited to: vanadium fluoride, vanadium oxyfluoride, iron fluoride, iron oxyfluoride, aluminum fluoride, aluminum oxyfluoride, titanium fluoride, titanium oxyfluoride, zinc fluoride, zinc oxyfluoride, niobium fluoride, niobium oxyfluoride, tantalum fluoride, tantalum oxyfluoride, nickel fluoride, nickel oxyfluoride, magnesium fluoride, magnesium oxyfluoride, copper fluoride, copper oxyfluoride, manganese fluoride, and manganese oxyfluoride. These ceramics are both Li-ion permeable and electrolyte solvent impermeable, making them well-suited for use in Li-ion battery applications, for example.

In other embodiments, a polymer coating may be used to form the shell structure for the protective coating 540. For example, the polymer coating may be applied to the surface of the active material 520 as a sacrificial layer and then carbonized (e.g., through pyrolysis or thermal annealing) to leave behind a carbon shell acting as the protective coating 540.

In still other embodiments, a combination of materials may be used to form a composite protective coating. The appropriate selection and particular application of different materials to form the composite coating may lead to various further advantages, depending on the desired application, as the composite may be designed to take advantage of several disparate physical or chemical properties of the two or more constituent materials not found in either material alone.

FIGS. 7A-7F are cross-sectional views illustrating several different example composite protective coating structures according to various embodiments. In each case, a single, exemplary nanocomposite 704 is shown encased by the composite protective coating structures for illustration purposes. However, it will be appreciated that the exemplary nanocomposite 704 may in fact be composed of clusters of nanocomposites, part of a mixed material composite comprising one or more nanocomposites and other secondary materials, such as a binder, carbon conductive additive, or the like, as discussed above, and so forth.

Figure 7A:
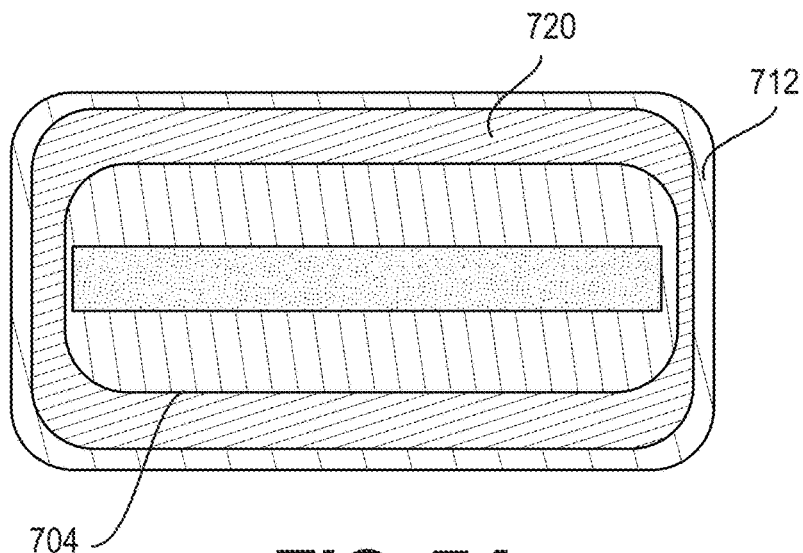
FIGS. 7A-7F are cross-sectional views illustrating several different example composite protective coating structures according to various embodiments.
Figure 7B:
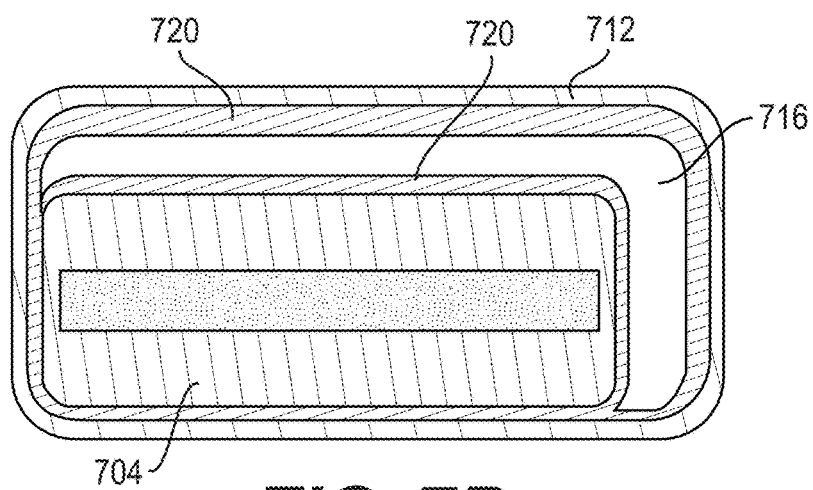
Figure 7C:
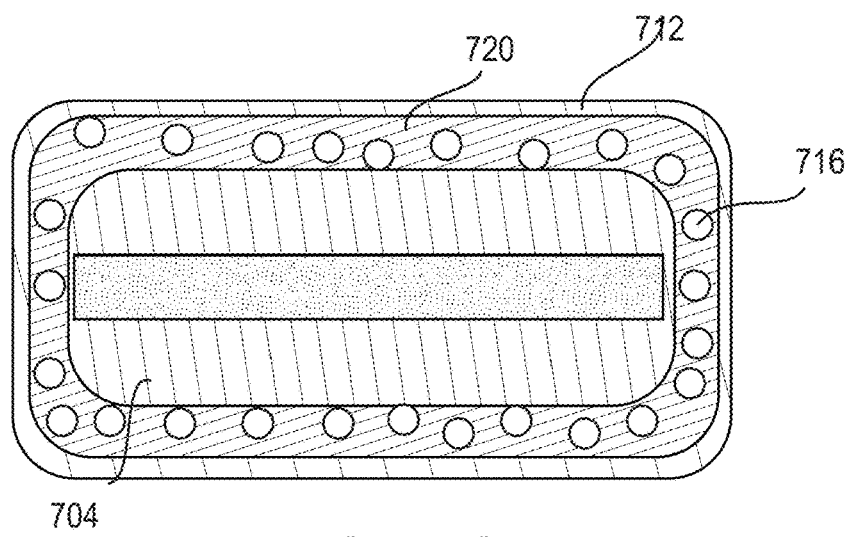

In the example designs shown in FIGS. 7A-7C, the composite protective coating is formed from an outer protective layer 712 (in this case, a metal oxide or metal fluoride shell) and an inner protective layer 720 (in this case, a carbon-based material). The use of a metal oxide or metal fluoride outer protective layer 712 prevents the diffusion of solvent molecules and other harmful or reactive molecules, and keeps them from reaching the surface of the active material of the nanocomposite 704. The use of a carbon-based inner protective layer 720 between the nanocomposite 704 and the metal oxide or metal fluoride outer protective layer 712 provides an electrically and ionically conductive path for the flow of both electrons and active ions, such as Li in the case of a Li-ion battery. The carbon-based inner protective layer 720 also forms an additional barrier against the diffusion of solvent molecules and other harmful or reactive molecules, further reducing the potential degradation of the underlying active material of the nanocomposite 704.

The combination of a mechanically stable outer shell structure that is both solid and an insoluble ionic conductor, in the form of the metal oxide or metal fluoride outer protective layer 712, for example, and a softer, flexible inner coating in the form of the carbon-based inner protective layer 720 therefore offers the advantages of both materials in a single, composite design. Further advantages may be achieved, however, through different structures of the inner protective layer 720, which may be formed in a variety of ways with different properties and different corresponding advantages. The various designs shown in FIGS. 7A-7C illustrate several examples.

In the design of FIG. 7A, the inner protective layer 720 is formed as a solid layer, such as an electrically conductive and ionically permeable carbon coating. This type of dense carbon layer helps to weaken the bonding between the active material of the nanocomposite 704 and the inner surface of the outer protective layer 712, allowing the outer protective layer 712 to remain expanded and mechanically stable as the nanocomposite 704 contracts inside of it during delithiation. As discussed above, a mechanical stable protective coating such as the outer protective layer 712 provides for the formation of a more stable SEI layer, which in turn provides additional protections against various degradation processes. The carbon coating is also generally flexible, and provides some cushion for the expansion of the nanocomposite 704 during lithiation, lessening any stress on the outer protective layer 712.

However, for some applications, additional expansion capacity may be required. Accordingly, in the design of FIG. 7B, the inner protective layer 720 is formed as a hollow layer, with thin coatings of carbonaceous material on the outer surface of the active material 704 and the inner surface of the outer protective layer 712, leaving a void or pore 716 in between. The additional volume of the pore 716 provides further space for active material expansion during lithiation, and may help to further alleviate any stress that may be exerted on the outer protective layer 712 as compared to the denser carbon coating in the design of FIG. 7A. These thin coatings on the outer surface of the nanocomposite 704 and the inner surface of the outer protective layer 712 still provide the advantages of an intervening electrically and ionically conductive coating as in the design of FIG. 7A, but to a more limited extent under the tradeoff of improved mechanical stress reduction.

The further design of FIG. 7C represents a more general and intermediate approach, in which the inner protective layer 720 is formed with a series of smaller pores 716 between the nanocomposite 704 and the inner surface of the outer protective layer 712. It will be appreciated that the pores 716 may not be perfectly arranged solely between the active material of the nanocomposite 704 and the inner surface of the outer protective layer 712 as shown for illustration purposes, and may instead, at times, infiltrate the active material of the nanocomposite 704 or form between any clusters of material making up the nanocomposite 704 during battery operation. This arrangement is intended to be included in the above description of the series of pores 716 as being formed "between" the nanocomposite 704 and the inner surface of the outer protective layer 712.

The density of the pores 716 may be tailored to fit a particular application (e.g., a particular active material), and adjusted to achieve a desired balance between the amount of carbon in the inner protective layer 720 (and hence, its electrical and ionic conductivity characteristics) and the amount of free space in the inner protective layer 720 (and hence, its capacity for expansion during lithiation and delithiation). For some applications including a silicon active material, it has been found that a total pore volume of approximately 70% of the volume occupied by the silicon active material core (or greater) provides sufficient space for expansion during lithiation.

Figure 7D:
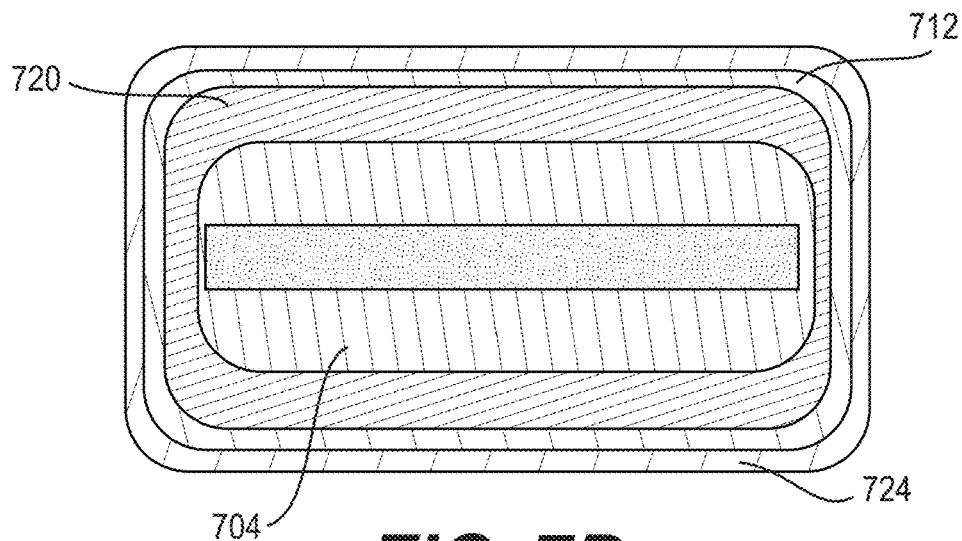
Figure 7E:
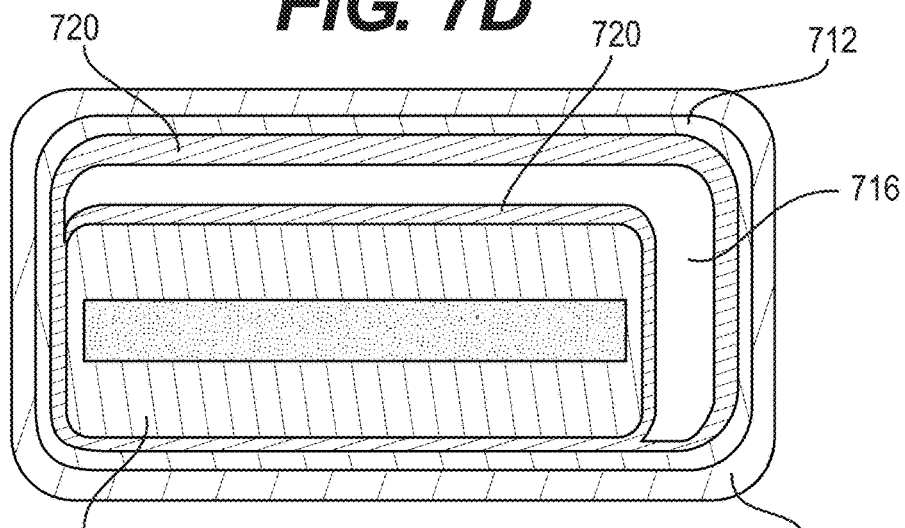
Figure 7F:
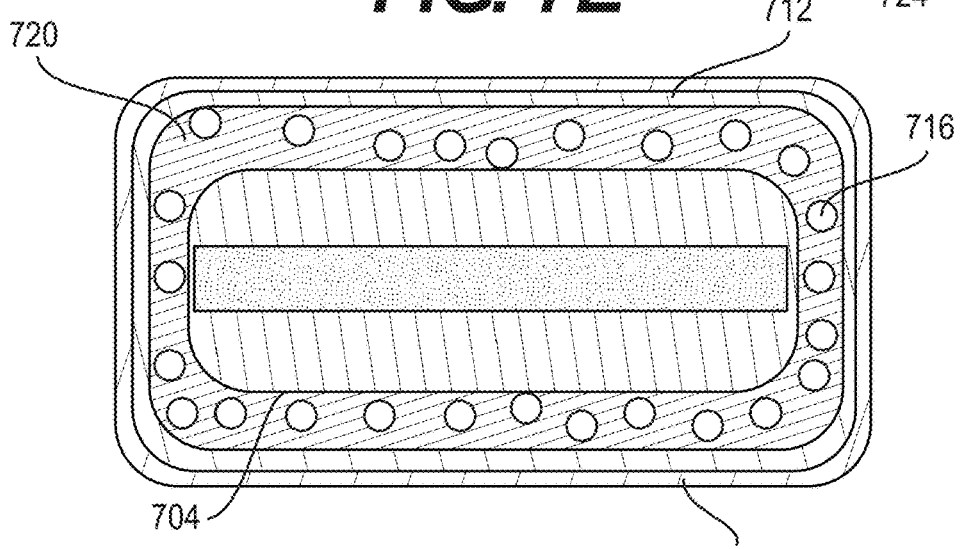

The example designs shown in FIGS. 7D-7F are identical to those shown in FIGS. 7A-7C, respectively, except that they include an additional conductive coating layer 724 around the outer protective layer 712. As discussed above in relation to the electrical interconnectivity of the constituent nanocomposites forming the agglomerate structures illustrated in FIGS. 3A and 3B, such an additional conductive coating layer 724 may be used to provide enhanced electrical connectivity among nanocomposites, which helps form an electrically conductive electrode. The additional conductive coating layer 724 may be formed from carbon or a conductive polymer, for example, and provides a still further barrier against the diffusion of solvent molecules and other harmful or reactive molecules, further reducing the potential degradation of the underlying active material in each nanocomposite 704.

Figure 8A:
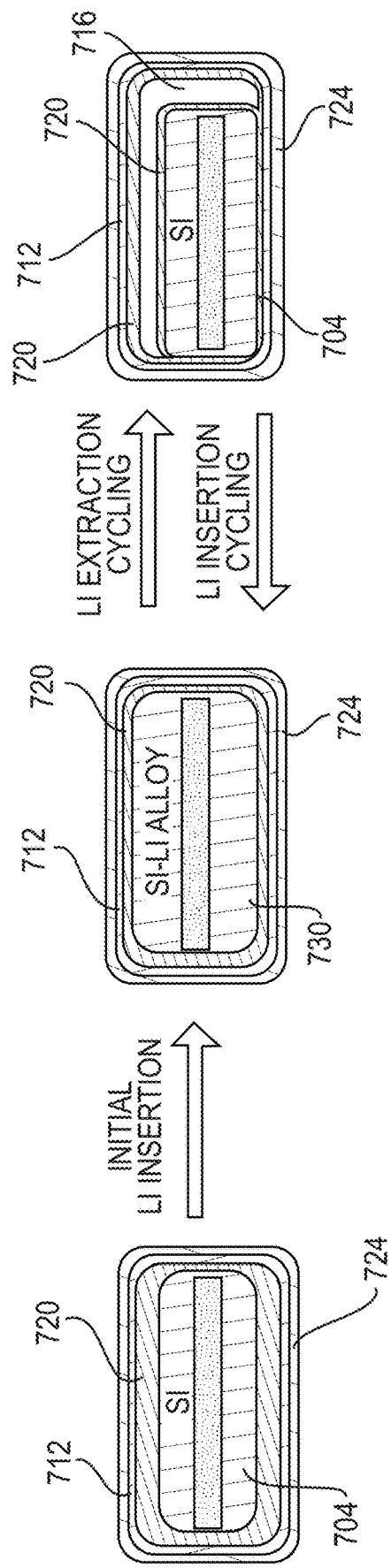
FIGS. 8A-8C are cross-sectional views illustrating the effects of lithiation and delithiation on the example composite protective coating structures of FIGS. 7D-7F.
Figure 8B:
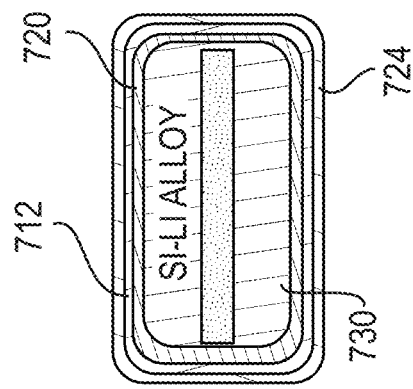
Figure 8B:
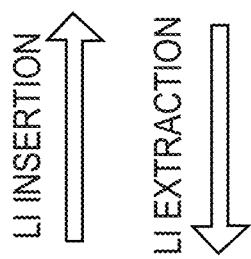
Figure 8B:
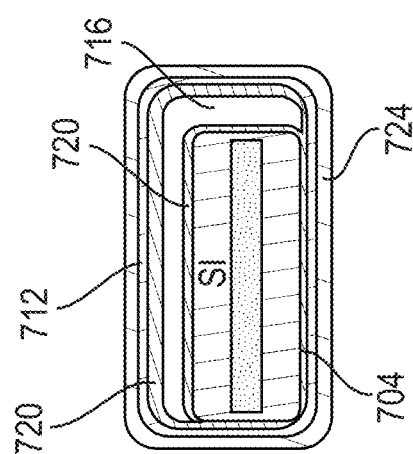
Figure 8C:
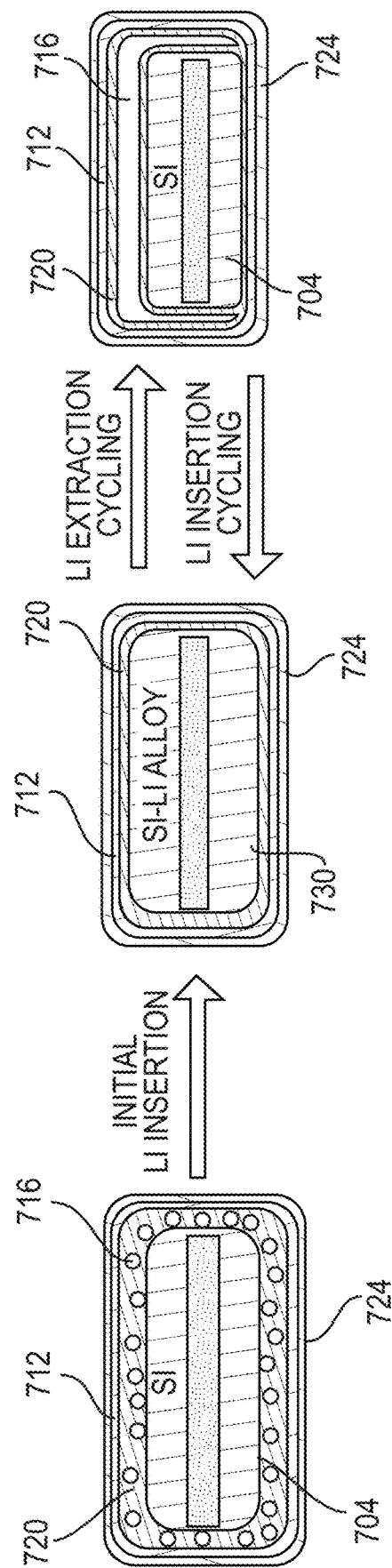

FIGS. 8A-8C are cross-sectional views illustrating the effects of lithiation and delithiation on the example composite protective coating structures of FIGS. 7D-7F. For simplicity, only the designs of FIGS. 7D-7F are shown explicitly, but the effects for FIGS. 7A-7C are substantially similar. In addition, the description below relates to a silicon active material and the formation of a Si—Li alloy for illustration purposes, but it will be appreciated that any suitable active material as discussed above may be alternatively employed.

As shown in FIG. 8A, during initial lithium insertion (e.g., the first charge of a Li-ion battery), lithium ions are inserted into the silicon active material 704 to form a Si—Li alloy 730. During formation, its outer surface area expands significantly, as described above, displacing and compacting the carbon-based inner protective layer 720. Subsequently, during additional cycling, lithium ions are extracted from the Si—Li alloy 730, returning it to its native silicon state 704. Depending on the particular inner protective layer 720 material used and the volume change experienced, the inner protective layer 720 or a portion thereof may retain its compacted form as shown. Thus, in some cases, the inner protective layer 720 may be compacted, at least partially, and a pore or pores 716 similar to those discussed above may be formed in the intervening space. The formation of such pores 716 in this manner may be advantageous in some applications (e.g., to accommodate further volume changes).

Turning to FIG. 8B, for structures of the inner protective layer 720 having a large pore design, the intrinsic space provided to accommodate swelling of the active material (such as silicon in the case of an anode material for use in Li-ion batteries) may be sufficient to avoid any initial insertion effects. In this case, the insertion of lithium ions into the silicon active material 704 forms the Si—Li alloy 730, its outer surface area expands accordingly to fill or partially fill the pore 716, and shrinks back to its original size during delithiation as the Si—Li-alloy 730 returns to its native silicon state 704.

Turning to FIG. 8C, for intermediate density pore designs, the initial lithium insertion and accompanying expansion of the silicon active material 704 to form the Si—Li alloy 730 may cause a displacement of the various small pores 716, which typically aggregate together as they are compacted as shown. Subsequently, during additional cycling, lithium ions are extracted from the Si—Li alloy 730 and it returns to its native silicon state 704. Depending on the density and initial arrangement of the various pores 716, as well as the volume change experienced, the pores 716 may return to their original configuration and density, or to an altered configuration and density as shown.

Initial lithium insertion, such as that shown in FIGS. 8A and 8C, can be performed in a variety of ways, including both in-situ (after battery cell assembly) and ex-situ (before battery cell assembly). For example, in-situ lithium insertion into an anode material may involve electrochemical lithium insertion during operation of the Li-ion battery, such as insertion of lithium taken from a Li-containing cathode material. For ex-situ lithium insertion into an anode material, lithiation may involve gas-phase reactions prior to assembling the anode powder into the electrode or prior to assembling the electrode into the Li-ion battery cell. Alternatively, ex-situ lithium insertion may include room temperature lithiation of the anode, according to which a soft, stabilized (dry room friendly) lithium powder may be deposited and spread onto a surface of a pre-formed porous anode in order to induce lithiation (primarily upon contact with the electrolyte). If such a process is performed in the presence of a solvent, an SEI layer may be simultaneously pre-formed on the anode surface. Lithium foil may be used instead of lithium powder in some designs.

It will be appreciated that the different composite protective coating structures of FIGS. 7A-7F can be formed in a variety of ways. Several example formation methods are described below.

Figure 9:
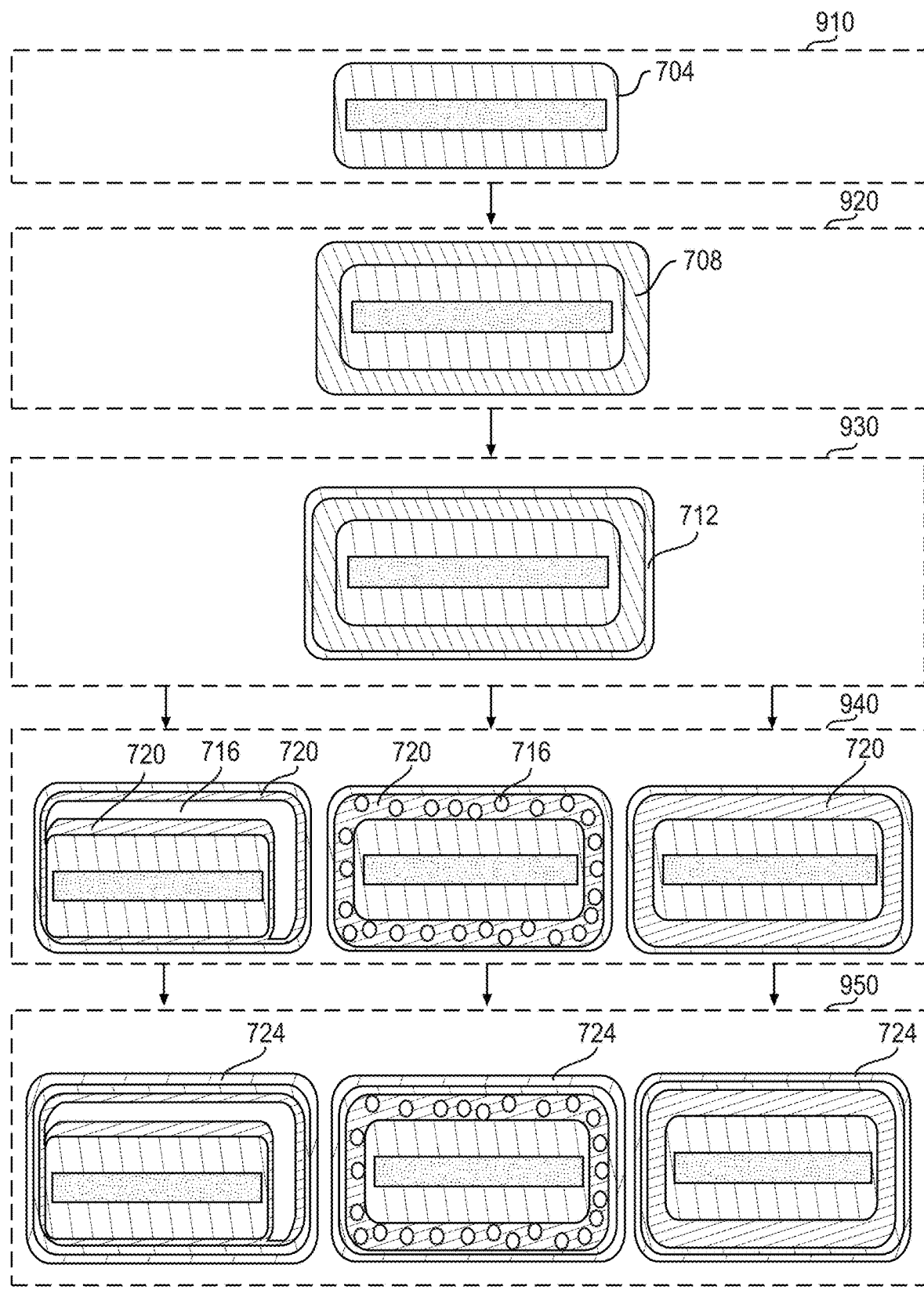
FIG. 9 is a graphical flow diagram from a cross-sectional perspective depicting a formation of the example composite protective coating structures of FIGS. 7A-7F according to one or more embodiments.

FIG. 9 is a graphical flow diagram from a cross-sectional perspective depicting a formation of the example composite protective coating structures of FIGS. 7A-7F according to one or more embodiments. In this example, formation begins with the provision one or more curved planar nanocomposites 704 in step 910. Again, it will be appreciated that the nanocomposite 704 is shown in the singular for illustration purposes only, and that the exemplary nanocomposite 704 may in fact be composed of clusters of nanocomposites, part of a mixed material composite comprising one or more nanocomposites and other secondary materials, such as a binder, carbon conductive additive, or the like, as discussed above, and so forth.

In step 920, a sacrificial polymer coating 708, for example, is applied to the nanocomposite 704 as a precursor to the inner protective layer 720. The sacrificial polymer coating 708 and nanocomposite 704 are then further coated with the outer protective layer 712 (e.g., a metal oxide or metal fluoride) in step 930, using one or more known methods, such as atomic layer deposition (ALD), chemical vapor deposition (CVD), various wet chemistry methods, or other methods known in the art.

In step 940, one of the different pore designs of FIGS. 7A-7F is selected, as desired, and formed out of the sacrificial polymer coating 708. The particular processes involved depend on the desired structure of the inner protective layer 720 and its associated pores 716 (or lack thereof, as the case may be). In particular, the sacrificial polymer coating 708 can be transformed into the desired structure via heat treatment (e.g., annealing in a gaseous environment), via a hydrothermal process, or other techniques as appropriate for the desired structure. Depending on the polymer composition and transformation conditions, the sacrificial polymer may be transformed into: (a) a dense carbon structure as in the design of FIG. 7A; (b) a thin layer of carbonaceous material covering the nanocomposite 704 and the inner surface of the outer protective layer 712 as in the design of FIG. 7B; or (c) a porous carbon structure as in the design of FIG. 7C.

For the further designs of FIGS. 7D-7F, additional processing is performed in step 950 to form the additional conductive polymer or carbon coating 724, for example, on the surface of the outer protective layer 712. For an additional conductive coating 724 formed from carbon, the carbon can be deposited by CVD (e.g., decomposition of hydrocarbon gaseous precursors), formation and decomposition of a polymer layer, hydrothermal carbonization, or other techniques. For an additional conductive coating 724 formed from conductive polymers, the conductive polymer coating can be deposited via plasma assisted polymerization, microwave assisted polymerization, solution polymerization in a suspension of the nanocomposites to be coated or spray-drying of a joint suspension of the nanocomposites with the polymer in solution or in the form of polymer nanoparticles.

Returning to the underlying curved planar nanocomposites themselves, regardless of what finishing steps and/or coatings are applied, if any, it will be further appreciated that the nanocomposite structure can be formed in a variety of ways, many of which have already been discussed.

Figure 10:
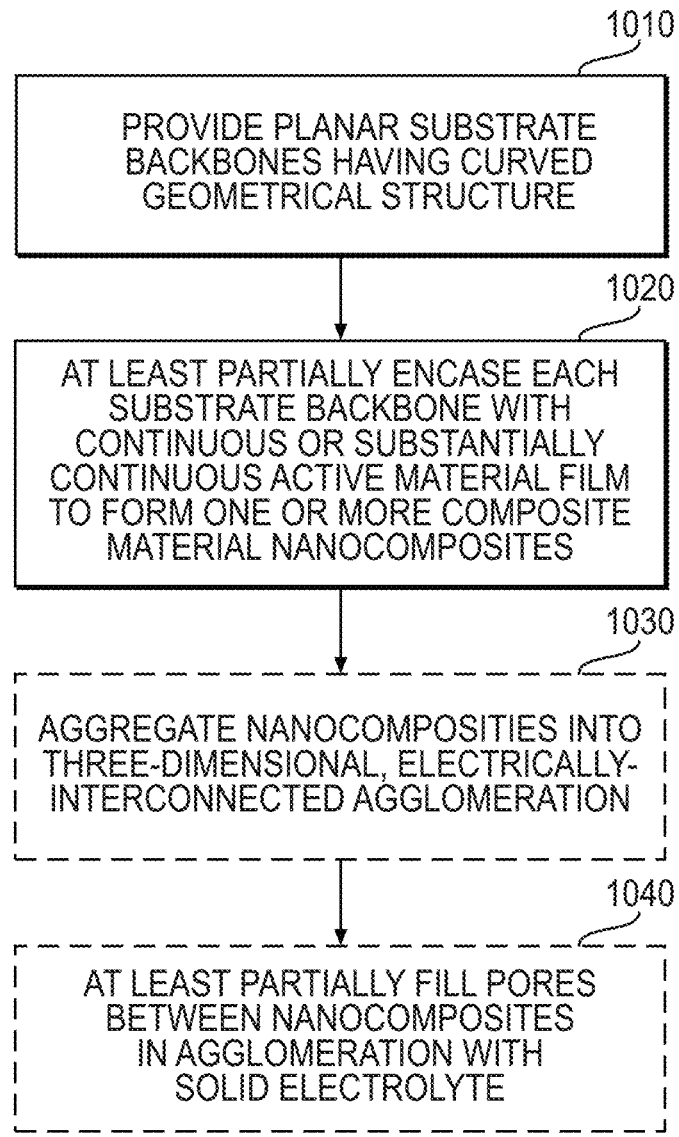
FIG. 10 is a process flow diagram illustrating an example method of forming a curved planar nanocomposite according to one or more embodiments.

FIG. 10 is a process flow diagram illustrating an example method of forming a curved planar nanocomposite according to one or more embodiments. In this example, one or more planar substrate backbones are provided having a curved geometrical structure (step 1010), and each substrate backbone is at least partially encased with a continuous or substantially continuous active material film to form one or more composite material nanocomposites (step 1020). According to various embodiments, further processing steps may be performed to obtain the desired shape, 3-D structure, material composition, etc., as discussed above. In this example, these further processing steps are represented by the optional, exemplary steps of aggregating the nanocomposites into a three-dimensional, electrically-interconnected agglomeration (step 1030), and/or at least partially filling pores between the nanocomposites in the agglomeration with a solid electrolyte (step 1040).

FIGS. 11-13 show example characterizations of particular nanocomposite structures fabricated according to certain embodiments for illustration purposes. For these example characterizations, carbon and silicon coated graphene electrodes of the type described above were prepared from a water-based slurry containing 15 wt. % poly(acrylic) acid binder. After casting, the electrode was dried in a conventional oven at 70° C. for two hours and in a vacuum oven at 70° C. for eight hours. Electrodes were spot-welded to a 2016-type coin cell and then assembled into half cells with a lithium foil counter electrode in an Ar filled glovebox (e.g., less than about 1 ppm $H_2O$, $O_2$). An electrolyte solution containing 1.0 M $LiPF_6$ in carbonates was used. Galvanostatic charge-discharge cycling was performed at between 10 mV and 1 V. The Coulombic efficiency was calculated by taking a ratio of the capacity after lithium dealloying to the capacity after lithium alloying. Cyclic voltammetry in the potential window of 0 to 1.2 V at a rate of 0.014 $mV·s^{-1}$ was performed.

FIGS. 11A-11F present several scanning electron microscopy (SEM) micrographs (FIGS. 11A, 11C, 11E, 11F) and transmission electron microscopy (TEM) micrographs (FIGS. 11B, 11D) showing the formation of one particular example silicon-graphene nanocomposite of the type illustrated in FIG. 2. SEM images were taken using a 10 kV accelerating voltage and a 5-7 mm working distance. TEM studies were performed at an accelerating voltage of 100 kV.

Figure 11A:
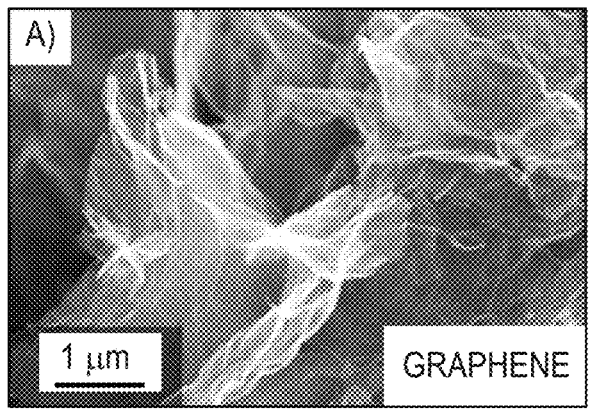
FIGS. 11A-11F present several scanning electron microscopy (SEM) micrographs (FIGS. 11A, 11C, 11E, 11F) and transmission electron microscopy (TEM) micrographs (FIGS. 11B, 11D) showing the formation of one particular example Si-graphene nanocomposite of the type illustrated in FIG. 2.
Figure 11B:
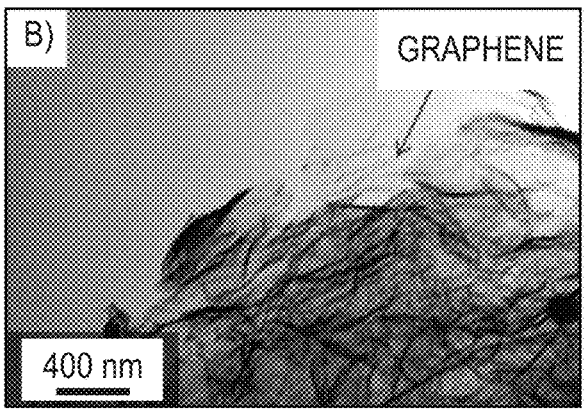
Figure 11C:
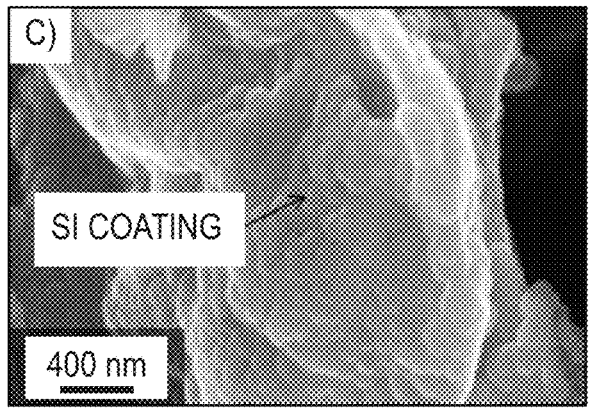
Figure 11D:
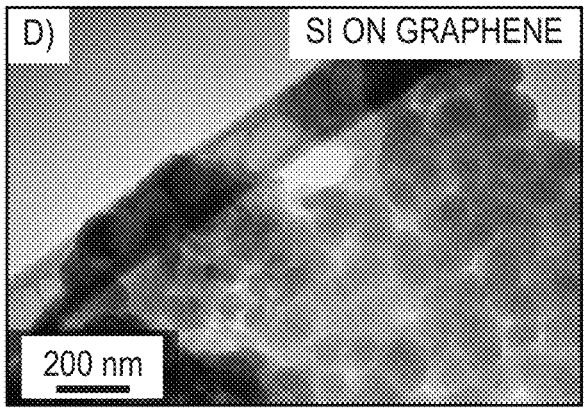
Figure 11E:
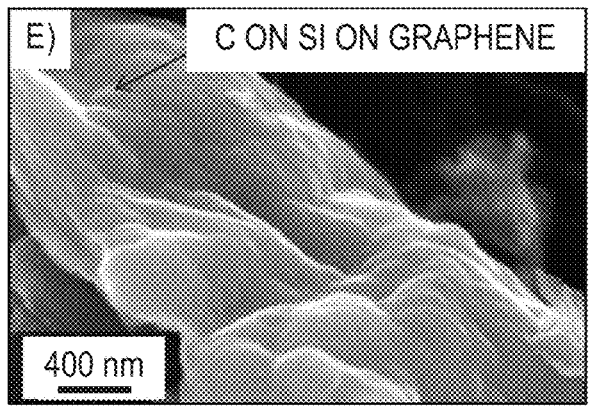
Figure 11F:
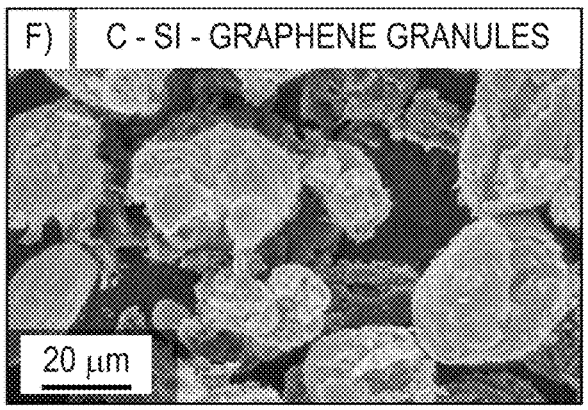

As shown, silicon nanoparticles were deposited so as to uniformly coat the smooth graphene sheets (FIGS. 11A-11B), forming a rough continuous surface (FIGS. 11C-11D). In this example, the silicon has an amorphous structure with no crystallites being observed in the TEM images. As shown in FIG. 11E, the carbon layer uniformly coats the silicon surface reducing surface roughness. As shown in FIG. 11F, the produced composite particles approximately retain the original size of the graphene sheets (e.g., about 10-30 μm).

Figure 12A:
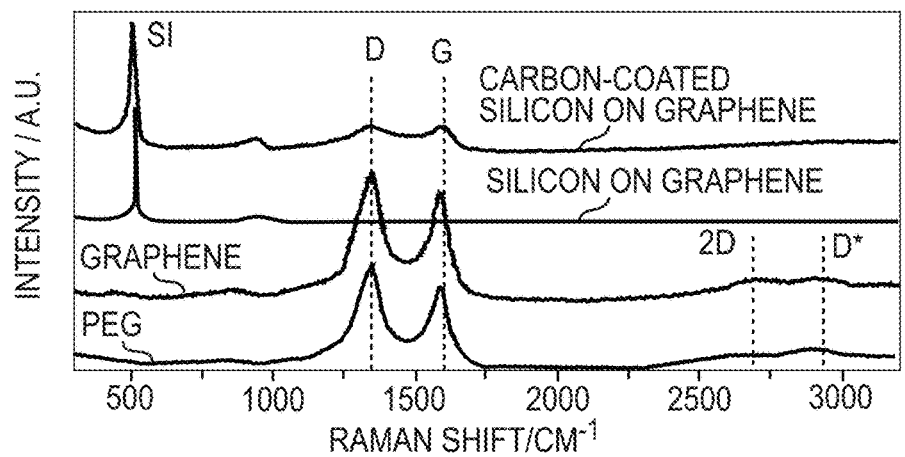
FIGS. 12A-12C illustrate several example characterizations of the graphene and graphene-based nanocomposite shown in FIGS. 11A-11F by Raman spectroscopy (FIG. 12A), X-ray diffraction (FIG. 12B), and N2 physisorption (FIG. 12C).
Figure 12B:
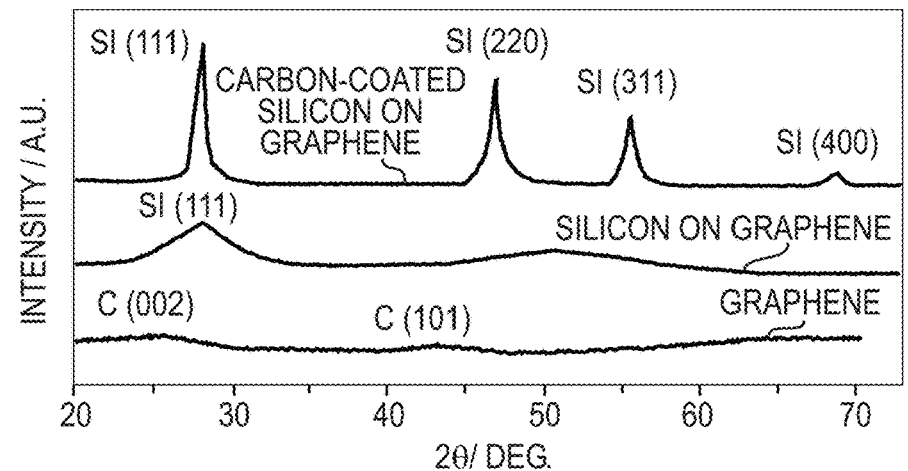
Figure 12C:
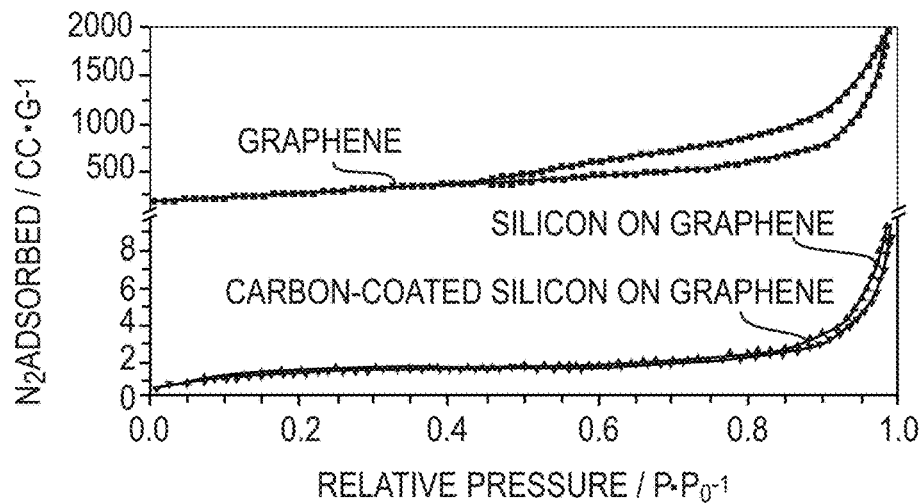

FIGS. 12A-12C illustrate several example characterizations of the graphene and graphene-based nanocomposite shown in FIGS. 11A-11F by Raman spectroscopy (FIG. 12A), X-ray diffraction (FIG. 12B), and $N_2$ physisorption (FIG. 12C). For the Raman spectroscopy, an exposure time of five seconds with a 0.6 filter, 400 μm hole, 100 μm slit and 600 grating was used. The XRD parameters were as follows: 45 kV accelerating voltage, 40 mA current, 0.033° 2θ-step size, and 120 second record time. $N_2$ physisorption at −196° C. allowed for the determination of the specific surface area of the initial and coated materials. Each sample was degassed in $N_2$ gas at 100° C. and 300° C. for at least 30 minutes and 8 hours, respectively, prior to the measurements. The Brunauer-Emmett-Teller method was used to calculate the surface area.

As demonstrated by the Raman spectroscopy of FIG. 12A, the synthesized graphene shows nearly the same spectra as commercially available purified exfoliated graphite (PEG), indicating that at least some portion of the produced graphene had more than five layers. Characteristic Raman peaks for carbon materials are the disorder-induced D band at approximately 1350 cm', the graphitic G band at approximately 1580 cm', the second order G' band (also known as the 2D band) at approximately 2700 cm', and the D" band (also known as the D+G band) at approximately 2900 cm'. The large D peak and the small relative intensity of the 2D peak indicate a high concentration of defects, dangling bonds, and structural disorder present. These defects may serve as nucleation sites for silicon nanoparticle deposition, and allow uniform coating formation. As demonstrated by the Raman spectroscopy of FIG. 12A, in this particular example, deposition of silicon is on the order of approximately 520 cm$^{-1}$. The lack of carbon peaks in the silicon-coated sample (FIG. 12A) indicates conformal silicon deposition, consistent with the SEM and TEM measurements of FIGS. 11A-11F. The carbon deposition is confirmed by the reappearance of D and G peaks. The small shift in the silicon band suggests stresses caused by the difference in the thermal expansion of silicon and carbon in this particular example.

As shown in FIG. 12B, weak graphite peaks of approximately 26° and approximately 43° appear in the X-ray diffraction (XRD) pattern for this design, but are suppressed after silicon coating. The broad silicon peaks again indicate an amorphous structure of silicon on the graphene surface. As evidenced by the formation of diffraction peaks, carbon deposition at higher temperatures may cause crystallization of silicon.

As shown by analysis of $N_2$ sorption isotherm on the produced graphene in FIG. 12C, a very high specific surface area may be achieved (e.g., about 940 m$^2$·g$^{-1}$ in this example). Micropores may also be present to varying degrees. However, silicon and carbon deposition may help eliminate the smallest pores and reduce the surface area of the produced nanocomposite (e.g., to approximately 5 m$^2$·g$^{-1}$ in this example).

Figure 13A:
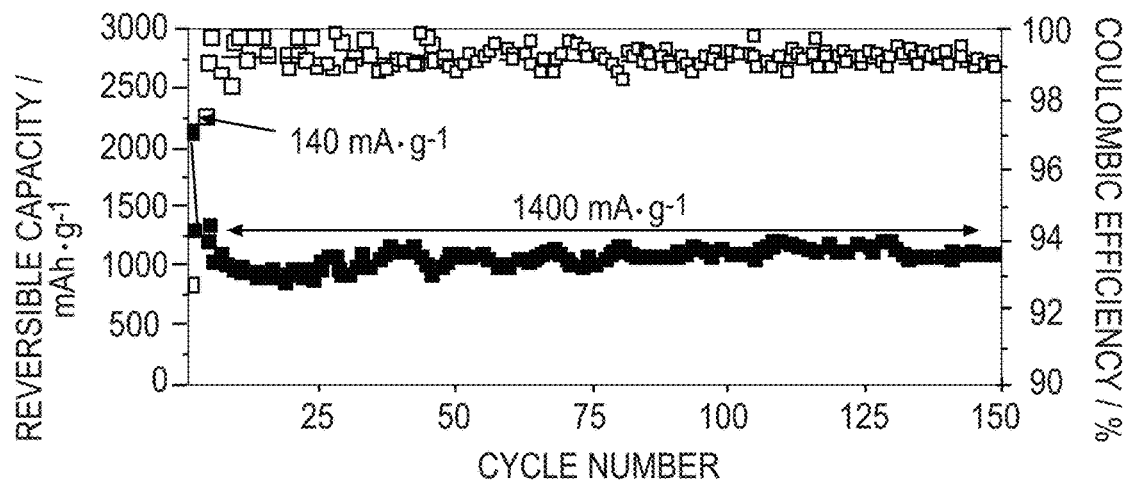
FIGS. 13A-13C illustrate example electrochemical performance data for such a C—Si-graphene electrode.
Figure 13B:
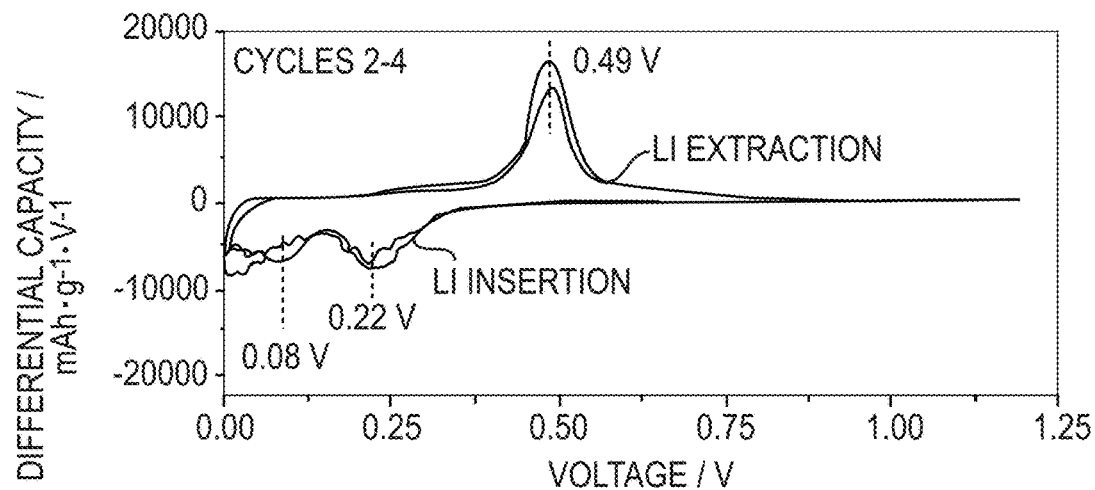
Figure 13C:
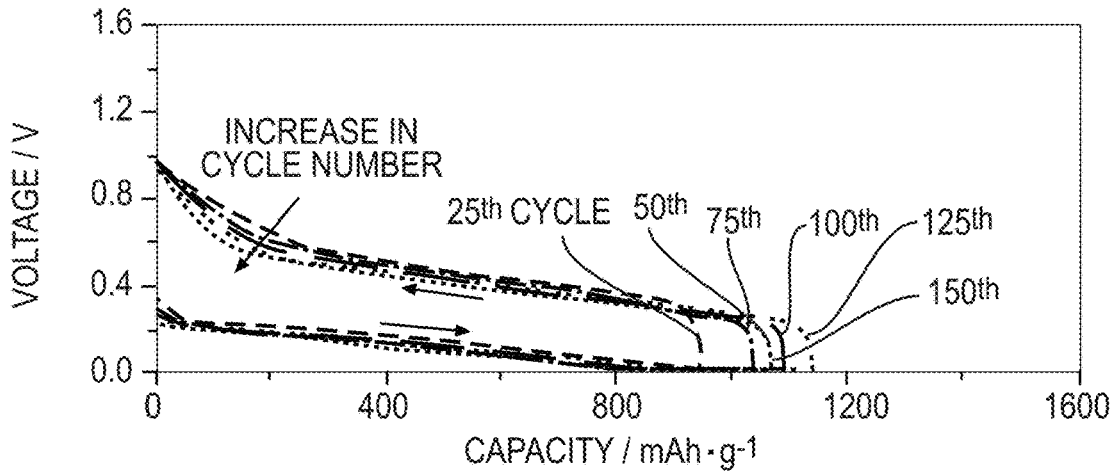

FIGS. 13A-13C illustrate example electrochemical performance data for such a C—Si-graphene electrode. In particular, FIG. 13A shows sample capacity data (per mass of the composite) and Coulombic Efficiency (CE) data as a function of cycle number, FIG. 13B shows a sample differential capacity plot, and FIG. 13C shows sample charge-discharge profiles for selected cycles.

In this particular example, electrochemical performance evaluation of the produced nanocomposite was performed in the potential range from about 10 mV to about 1 V in 2016-type coin cells with a metallic lithium foil counter electrode. As shown in FIG. 13A, the first cycle recorded at the low current density of 140 mA·g$^{-1}$ showed a high reversible discharge capacity of approximately 2300 mAh·g$^{-1}$ (1080 mAh·cc$^{-1}$). This reversible capacity is over six times greater than the theoretical capacity of graphite, thus indicating a high degree of lithium alloying with silicon. Increasing the current density to 1400 mA·g$^{-1}$ resulted in the reduction of the average specific reversible capacity to approximately 1060 mAh·g$^{-1}$. Stability of the produced electrodes for 150 cycles is particularly noteworthy considering that the lithium insertion capacity and the resulting silicon expansion were not limited. Another advantage of the produced nanocomposite in this example is its high CE (e.g., about 99%, on average), owing at least in part to the low composite surface area, planar silicon geometry, and good cycle stability.

As shown by the cyclic voltammetry analysis of the potentials at which lithium (de-) alloying occurs in FIG. 13B, broad lithiation peaks are observed at 0.08 and 0.22 V vs. Li/Li$^+$, consistent with carbon-coated silicon. Here, the lithium was extracted from silicon at 0.49 V. The peak height slightly increases after the second cycle, indicating improved cycling kinetics. Carbon delithiation occurs at potentials lower than silicon and corresponding peaks are not evident in the differential capacity curves due to the significantly larger lithium capacity of silicon.

The charge/discharge voltage profiles of FIG. 13C show transformations in the electrode during cycling. The shapes of the profiles are similar to the profiles for other silicon electrodes. With increasing cycling number, the lithium extraction profiles become more horizontal and exhibit slightly smaller overpotential, suggesting a gradual improvement in the discharge kinetics.

Figure 14:
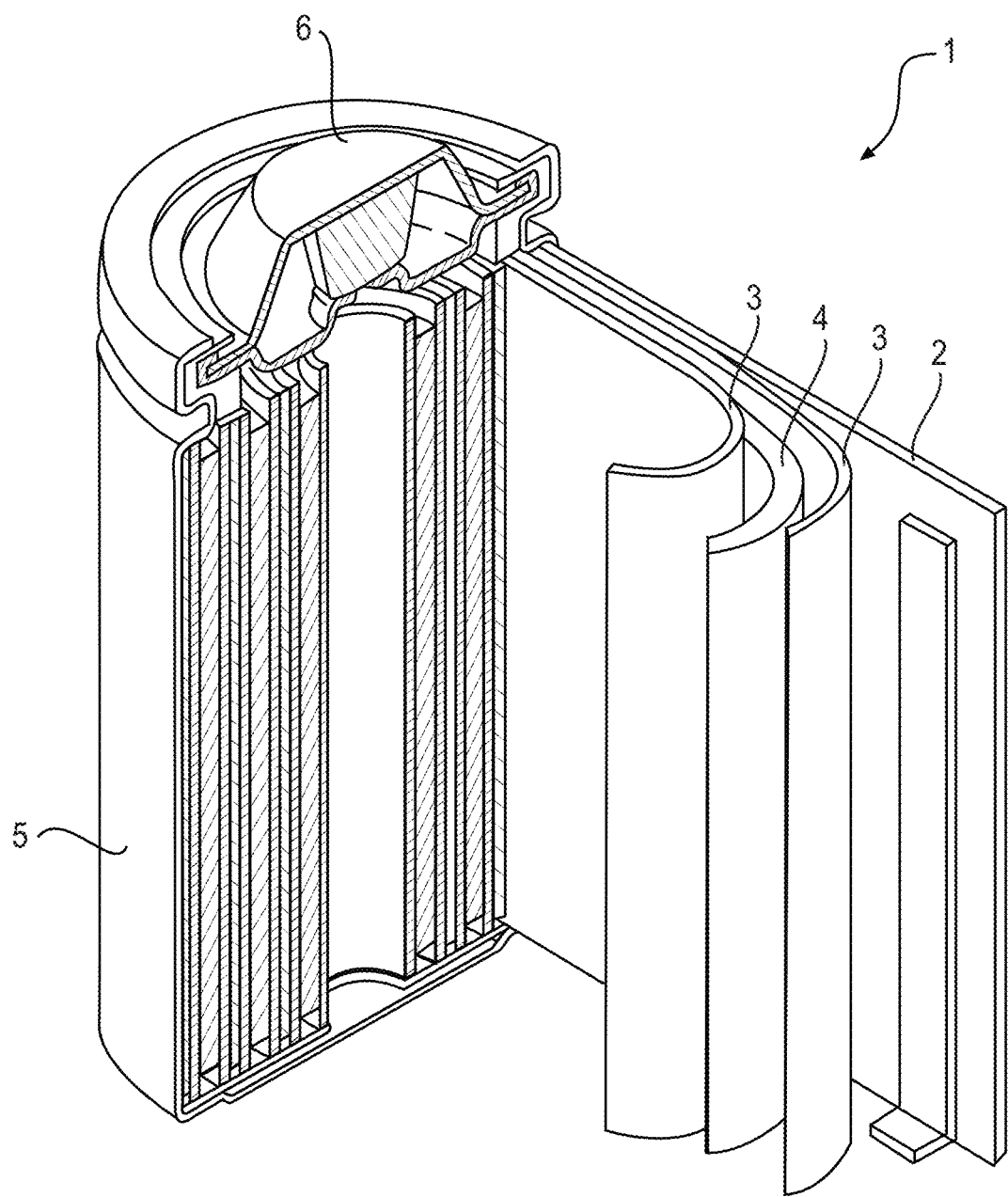
FIG. 14 illustrates an example Li-ion battery in which the above devices, methods, and other techniques, or combinations thereof, may be applied according to various embodiments.

FIG. 14 illustrates an example Li-ion battery in which the above devices, methods, and other techniques, or combinations thereof, may be applied according to various embodiments. A cylindrical battery is shown here for illustration purposes, but other types of arrangements, including prismatic or pouch (laminate-type) batteries, may also be used as desired. The example Li-ion battery 1 includes a negative anode 2, a positive cathode 3, a separator 4 interposed between the anode 2 and the cathode 3, an electrolyte impregnating the separator 4, a battery case 5, and a sealing member 6 sealing the battery case 5. It will be appreciated that the example Li-ion battery 1 may simultaneously embody multiple aspects of the present invention in various designs.

The preceding description is provided to enable any person skilled in the art to make or use embodiments of the present invention. It will be appreciated, however, that the present invention is not limited to the particular formulations, process steps, and materials disclosed herein, as various modifications to these embodiments will be readily apparent to those skilled in the art. That is, the generic principles defined herein may be applied to other embodiments without departing from the spirit or scope of the invention, which should only be defined by the following claims and all equivalents.

The invention claimed is:

1. An Li-ion anode composition, comprising:
   a porous nanocomposite material including:
      electrically conductive, curved single-layer graphene coated with Si nanoparticles, and
      a mechanically stable, deformable, protective coating capable of preventing electrolyte solvent access to the Si nanoparticles, accommodating expansion of the Si nanoparticles during lithiation without forming cracks or voids, limiting an external surface area of a surface of the nanocomposite material on which solid electrolyte interphase (SEI) is formed, and stabilizing the SEI that is formed on the surface of the nanocomposite material.

2. The Li-ion anode composition of claim 1, further comprising:
   a polymer binder.

3. The Li-ion anode composition of claim 2, wherein the polymer binder comprises a polyacrylic composition.

4. The Li-ion anode composition of claim 1, wherein the protective coating comprises pores.

5. The Li-ion anode composition of claim 1, wherein the protective coating comprises carbon.

6. The Li-ion anode composition of claim 1, wherein the protective coating comprises polymer.

7. The Li-ion anode composition of claim 1, wherein the protective coating comprises an oxide.

8. The Li-ion anode composition of claim 1, wherein the protective coating comprises two or more layers.

9. The Li-ion anode composition of claim 1, wherein the Si nanoparticles are coated with a Li-ion permeable and electrically conductive material.

10. The Li-ion anode composition of claim 9, wherein the Li-ion permeable and electrically conductive material comprises carbon.

11. The Li-ion anode composition of claim 1, wherein one or more pores of the porous nanocomposite material are at least partially filled with a Li-ion conductive material.

12. The Li-ion anode composition of claim 1, wherein the curved single-layer graphene exhibits a radius of curvature in the range of about 0.3 nm to about 0.03 mm.

13. The Li-ion anode composition of claim 1, wherein the curved single-layer graphene exhibits a specific surface area of at least 940 $m^2 \cdot g^{-1}$.

14. The Li-ion anode composition of claim 1, wherein the curved single-layer graphene comprises one or more micropores.

15. The Li-ion anode composition of claim 1, wherein the curved single-layer graphene comprises a concentration of defects.

16. The Li-ion anode composition of claim 15, wherein the concentration of defects exceeds a concentration threshold such that the presence of Raman D-band has an intensity comparable or higher than Raman G-band.

17. The Li-ion anode composition of claim 1, wherein the porous nanocomposite material exhibits a substantially spherical or ellipsoidal shape.

18. A method of fabricating a Li-ion anode composition, comprising:
   coating Si nanoparticles on electrically conductive, curved single-layer graphene to produce a porous nanocomposite material; and
   coating a mechanically stable, deformable, protective coating on the porous nanocomposite material,
   wherein the protective coating is capable of preventing electrolyte solvent access to the Si nanoparticles, accommodating expansion of the Si nanoparticles during lithiation without forming cracks or voids, limiting an external surface area of a surface of the nanocomposite material on which solid electrolyte interphase (SEI) is formed, and stabilizing the SEI that is formed on the surface of the nanocomposite material.

19. The method of claim 18, wherein the Si nanoparticles are coated on the curved single-layer graphene via chemical vapor deposition (CVD).

20. The method of claim 19, wherein silane gas ($SiH_4$) is used as a precursor for the CVD of the Si nanoparticles.

21. The method of claim 18, wherein at least part of the protective coating is deposited via chemical vapor deposition (CVD) or atomic layer deposition (ALD).

22. The method of claim 21,
   wherein the at least part of the protective coating is deposited via CVD, and
   wherein a hydrocarbon gaseous precursor is used for the CVD deposition of the at least part of the protective coating.

23. The method of claim 18, wherein the protective coating comprises aluminum oxide.

* * * * *